US007938894B2

(12) United States Patent
Oyama et al.

(10) Patent No.: US 7,938,894 B2
(45) Date of Patent: May 10, 2011

(54) HYBRID ORGANIC-INORGANIC GAS SEPARATION MEMBRANES

(75) Inventors: Shigeo Ted Oyama, Blacksburg, VA (US); Yunfeng Gu, Painted Post, NY (US); Joe D. Allison, Ponca City, OK (US); Garry C. Gunter, Ponca City, OK (US); Scott A. Scholten, Ponca City, NY (US)

(73) Assignees: ConocoPhillips Company, Houston, TX (US); Virginia Tech Intellectual Properties, Inc., Blacksburg, VA (US)

( * ) Notice: Subject to any disclaimer, the term of this patent is extended or adjusted under 35 U.S.C. 154(b) by 562 days.

(21) Appl. No.: 12/039,664

(22) Filed: Feb. 28, 2008

(65) Prior Publication Data

US 2009/0205500 A1  Aug. 20, 2009

Related U.S. Application Data

(60) Provisional application No. 61/028,517, filed on Feb. 14, 2008.

(51) Int. Cl.
*B01D 53/22* (2006.01)
*B01D 71/02* (2006.01)
*B01D 71/06* (2006.01)

(52) U.S. Cl. .......... 96/11; 96/4; 96/7; 96/12; 96/13; 96/14; 96/45; 96/51; 96/55; 55/524; 55/DIG. 5; 210/490; 210/640; 210/500.21; 210/500.28; 427/248.1; 427/255.23; 427/255.28; 427/255.6

(58) Field of Classification Search .......... 96/4, 7, 96/11, 12, 13, 14; 95/45, 51, 55; 55/523, 55/524, DIG. 5; 210/489, 490, 640, 500.21, 210/500.28, 500.33; 427/245, 248.1, 255.23, 427/255.28, 255.6

See application file for complete search history.

(56) References Cited

U.S. PATENT DOCUMENTS

| 4,575,385 | A |   | 3/1986 | Brooks et al. |
|---|---|---|---|---|
| 4,881,954 | A |   | 11/1989 | Bikson et al. |
| 4,990,165 | A |   | 2/1991 | Bikson et al. |
| 5,286,280 | A | * | 2/1994 | Chiou ............................ 95/45 |
| 6,042,727 | A |   | 3/2000 | Jones et al. |
| 6,454,836 | B1 |   | 9/2002 | Koelmel et al. |
| 6,527,833 | B1 |   | 3/2003 | Oyama et al. |
| 6,544,419 | B1 | * | 4/2003 | Bhattacharyya et al. 210/500.26 |
| 6,730,364 | B2 |   | 5/2004 | Hong et al. |
| 6,854,602 | B2 |   | 2/2005 | Oyama et al. |
| 7,048,778 | B2 |   | 5/2006 | Gobina |
| 7,179,325 | B2 |   | 2/2007 | Oyama et al. |
| 2003/0222015 | A1 | * | 12/2003 | Oyama et al. ............ 210/500.21 |
| 2006/0090651 | A1 | * | 5/2006 | Liu et al. ........................ 96/121 |

(Continued)

OTHER PUBLICATIONS

McCool et al., "Amino-Functionalized Silica Membranes for Enhanced Carbon Dioxide Permeation", 2005, Adv. Funct. Mater., 15, 1635-1640.*

(Continued)

*Primary Examiner* — Jason M Greene
(74) *Attorney, Agent, or Firm* — Boulware & Valoir

(57) ABSTRACT

The invention discloses a composition comprising a hybrid composite organic-inorganic membrane. The hybrid organic-inorganic membrane according to the present invention may comprise an amorphous porous layer incorporating organic functionalities. The amorphous porous layer may be deposited on a porous alumina substrate by chemical vapor deposition (CVD). The amorphous porous layer may comprise a single top-layer (STL), multiple top-layers (MTL) or mixed top-layers (XTL). The substrate may comprise a single layer or multiple graded layers of alumina.

42 Claims, 17 Drawing Sheets

Schematic of a suitable CVD apparatus for use in the deposition of hybrid organic-inorganic layers.

U.S. PATENT DOCUMENTS

2007/0141325 A1* 6/2007 O'Gara et al. ............... 428/332
2008/0134895 A1* 6/2008 Ruud et al. ..................... 96/9
2009/0107330 A1* 4/2009 Gu ................................ 95/55

OTHER PUBLICATIONS

Kuraoka et al. "Permeation of Methanol Vapor Through Silica Membranes Prepared by the CVD Method with the Aid of Evacuation", 1999, Journal of Membrane Science, 160, 31-39.*

Okui et al. "Gas Permeation of Porous Organic/Inorganic Hybrid Membranes", 1995, Journal of Sol-Gel Science and Technology, 5, 127-134.*

Okui et al; "Gas Permeation Porous Organic/Inorganic Hybrid Membranes"; Journal of Sol-Gel Science and Technology, (1995); 5,127-134.

Smaihi et al; "Organic-inorganic gas separation membranes: Preparation and characterization"; Journal of Membrane Science, (1996) 116,211-220.

Sea et al; "Pore size control and gas permeation kinetics of silica membranes by pyrolysis of phenyl-substituted ethoxysilanes with cross-flow through a porous support wall"; Journal of Membrane Science, (1997) 130, 41-51.

Yan et al., "Hydrogen-Permselective $SiO_2$ Membrane Formed in Pores of Alumina Support Tube by Chemical Vapor Deposition with Tetraethyl Orthosilane"; Ind. Eng. Chem. Res.,1994, 33, 2096-2101.

Ha et al, "Chemical vapor deposition of hydrogen-permselective silica films on porous glass supports from tetraethylorthosilicate"; J. Membrane Science, 1993, 85, 279-290.

Prabhu et al, "Highly hydrogen selective ceramic membranes: application to the transformation of greenhouse gases"; J. Membrane Science, 2000, 176, 233-248.

* cited by examiner

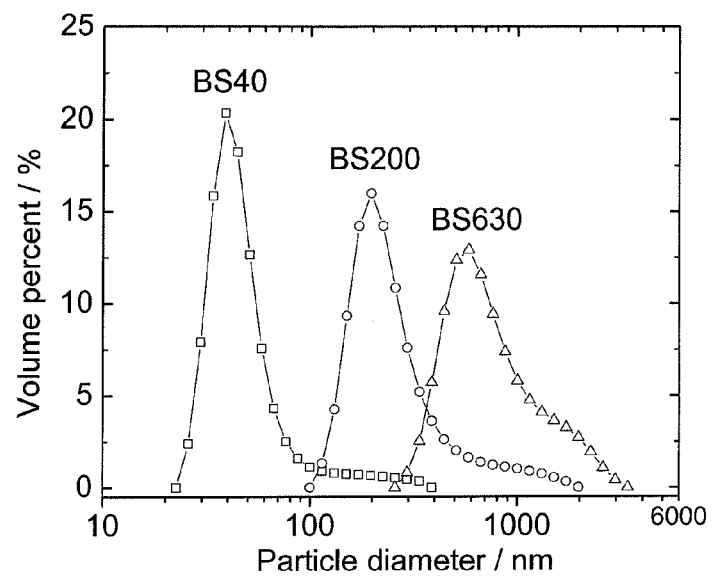
FIG. 1. Graph of particle size distributions of three boehmite sols with a median particle size of 40, 200 and 630 nm. These sols were used to prepare the gamma-alumina multilayer substrate.

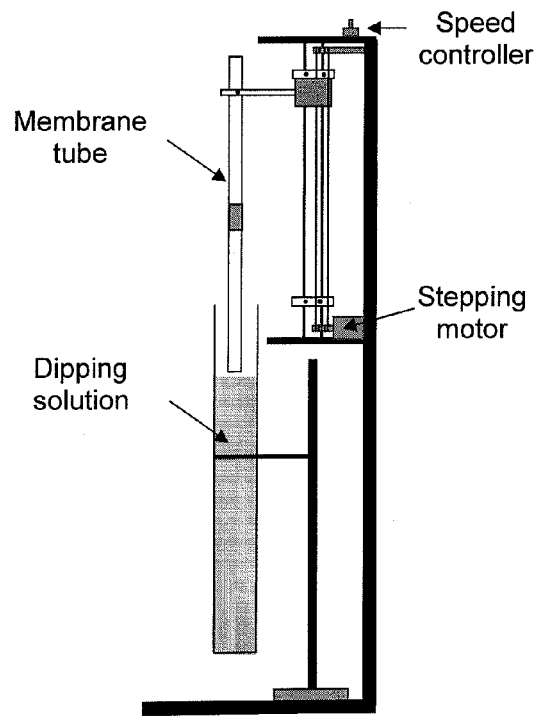
FIG. 2. Schematic of dip-coating machine for use in preparation of gamma-alumina substrates.

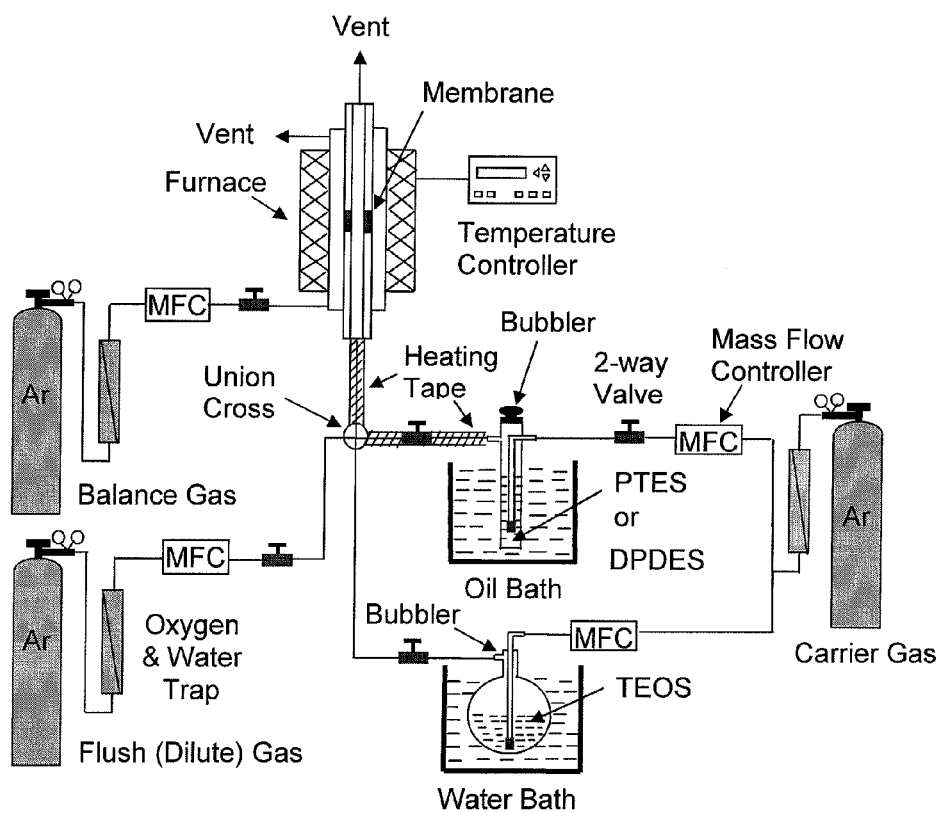
FIG. 3. Schematic of a suitable CVD apparatus for use in the deposition of hybrid organic-inorganic layers.

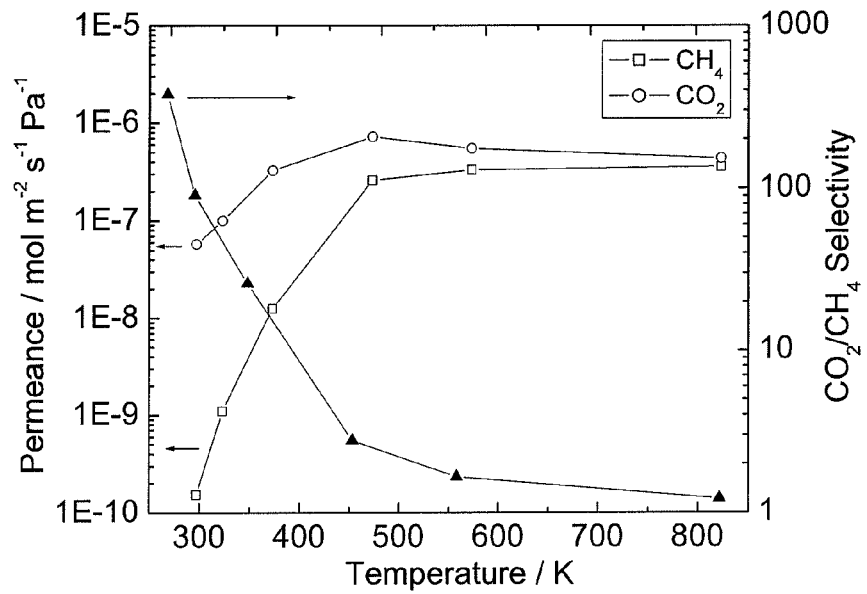
FIG. 4. Graph of permeation properties at different temperature for the $CO_2$-selective hybrid membrane STL-823-II prepared at 823 K using the CVD condition II with a medium PTES concentration of 0.19 mol m$^{-3}$.

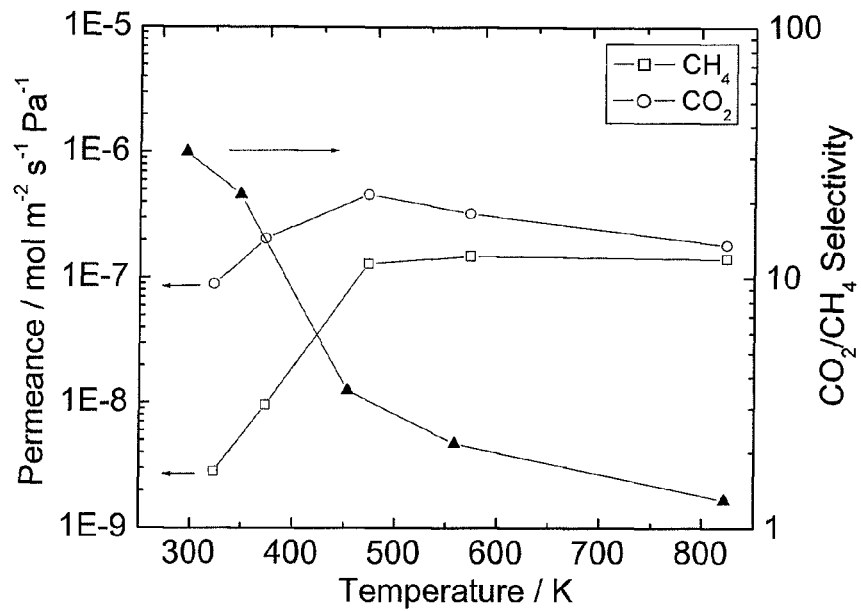
FIG. 5. Graph of permeation properties at different temperature for the $CO_2$-selective hybrid membrane STL-823-I prepared at 823 K using the CVD condition III with a low PTES concentration of 0.11 mol m$^{-3}$.

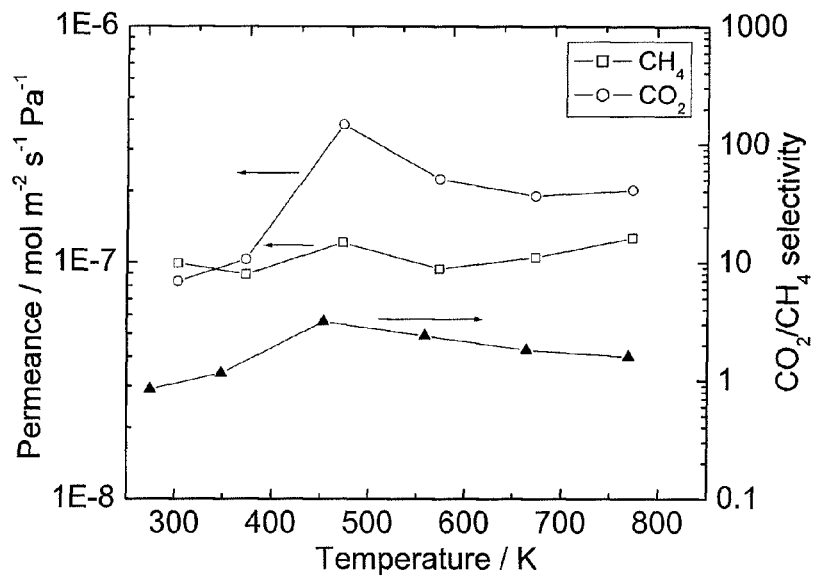

FIG. 6. Graph of permeation properties at different temperature for the $CO_2$-selective hybrid membrane STL-773-I prepared at a low deposition temperature of 773 K using the CVD condition I with a low PTES concentration of 0.11 mol m$^{-3}$.

Graph of permeation properties at different temperature for the $CO_2$-selective hybrid membrane STL-773-I prepared at a low deposition temperature of 773 K using the CVD condition I with a low PTES concentration of 0.11 mol m$^{-3}$.

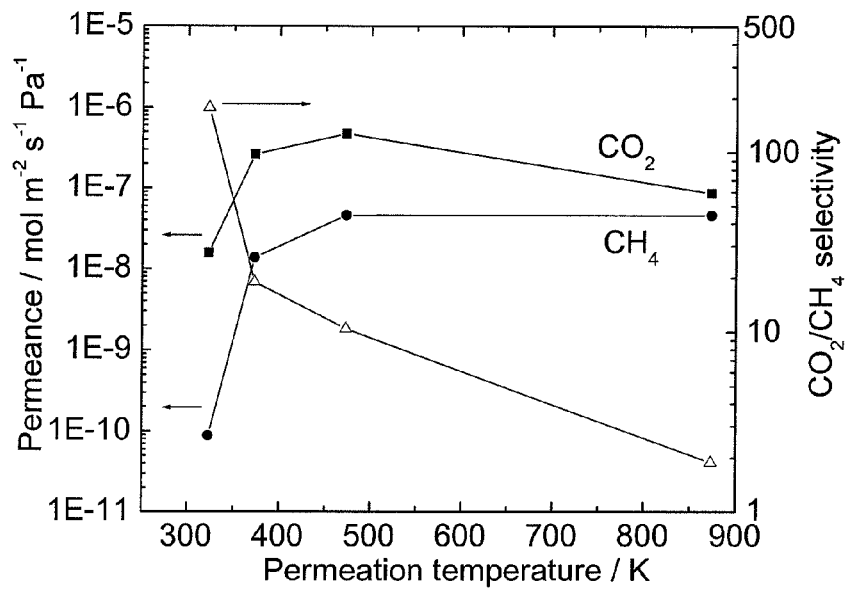
FIG. 7. Graph of permeation properties at different temperature for the $CO_2$-selective hybrid membrane STL-873-II prepared at a high deposition temperature of 873 K using the CVD condition II with a medium PTES concentration of 0.19 mol m$^{-3}$.

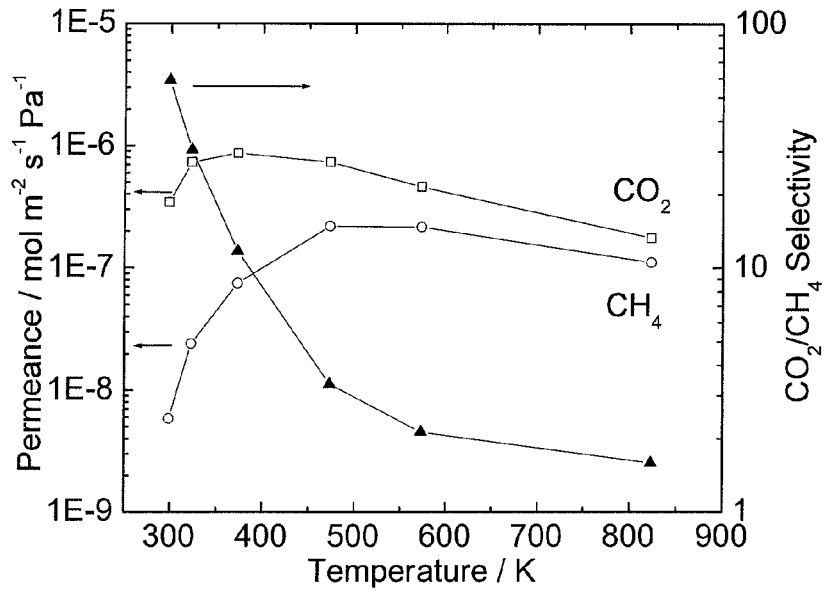
FIG. 8. Graph of permeation properties at different temperature for the $CO_2$-selective hybrid membrane STL-823-IV prepared at 823 K using the CVD condition IV. Diphenyldiethoxysilane (DPDES) was used as the Si source.

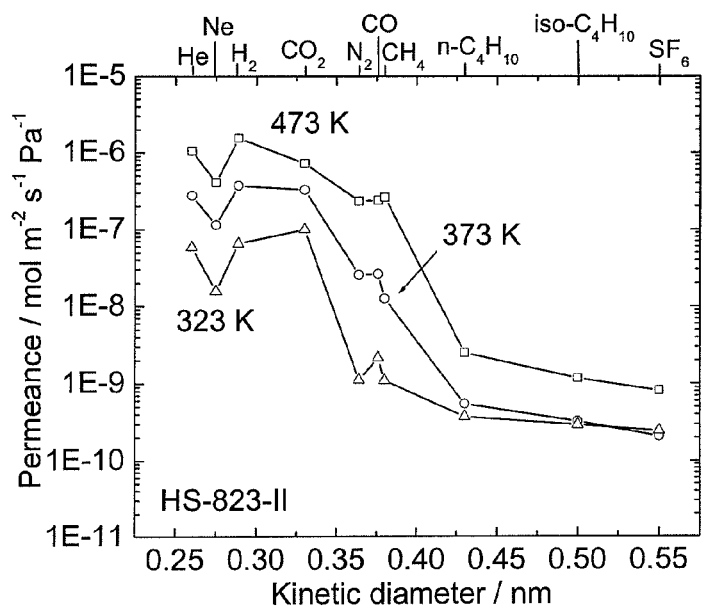
FIG. 9. Graph of permeances at different temperatures (473, 373 and 323 K) for different gas molecules through the $CO_2$-selective hybrid membrane STL-823-II. The membrane was prepared at 823 K with a medium PTES concentration of 0.19 mol m$^{-3}$.

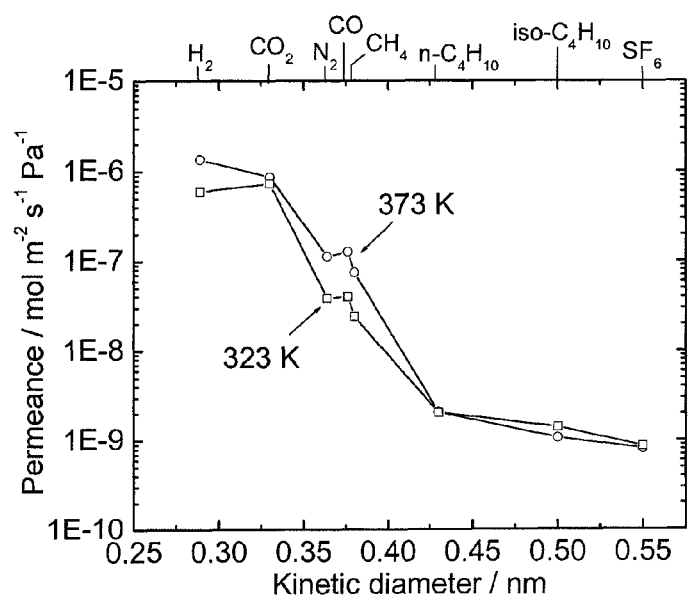
FIG. 10. Graph of permeances at different temperatures (373 and 323 K) for different gas molecules through the $CO_2$-selective hybrid membrane STL-823-IV. The membrane was prepared at 823 K with a medium DPDES concentration of 0.19 mol m$^{-3}$.

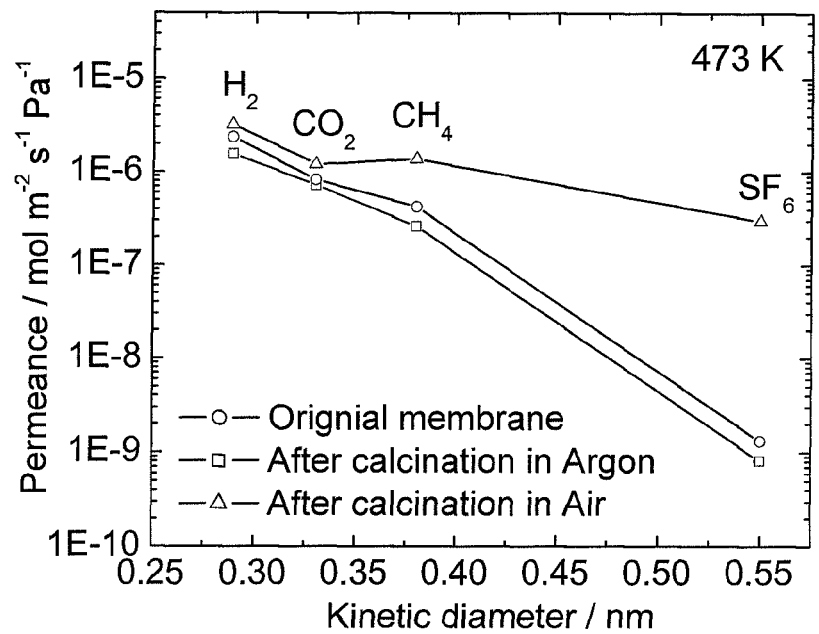
FIG. 11. Graph of changes of permeances through the $CO_2$-selective hybrid membrane STL-823-II after calcined at different environment.

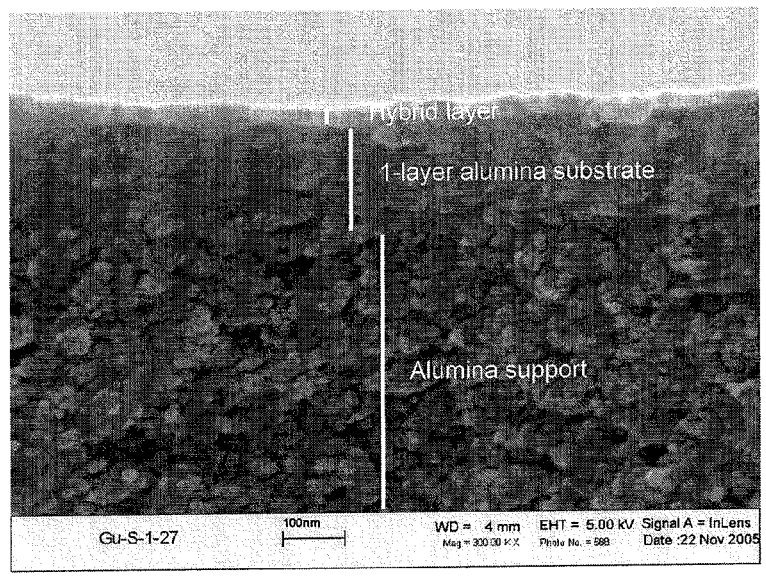
FIG. 12. Cross-sectional image of a hybrid membrane formed on a mesoporous alumina tube.

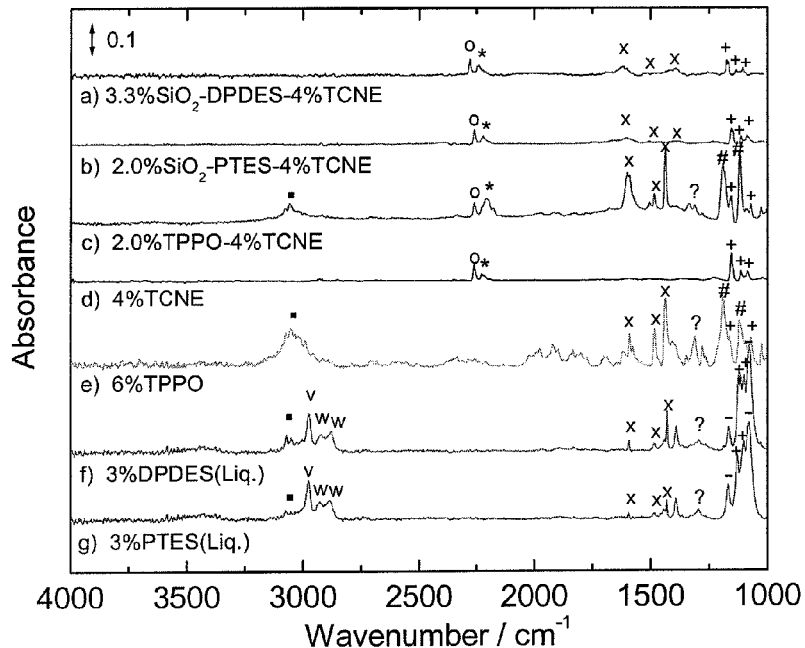

FIG. 13. FTIR spectra of the DPDES and PTES membrane samples and references.

- o   C≡N str. vib (Ref.1, pp. 84)
- \*   C=C str. (Ref.1, pp. 16)
- x   C=C aromatic str. (Ref.1, pp.17-18)
- +   C-C str. (Ref.1, pp.19)
- #   P=O str. (Ref.1, pp.19)
- -   Si-O-C asym. str. (Ref.1, pp. 19, 244)
- •   C-H str., aromatic ring CH (Ref.1, pp. 15)
- v   C-H asym. str., $CH_3$ (Ref.1, pp. 16)
- w   C-H asym. str., $CH_2$-alkanes (Ref.1, pp. 16)

Ref.1:
G. Socrates, Infrared and Raman Characteristic Group Frequencies, third edition, John Wiley & Sons Ltd, Baffins Lane, Chichester, West Sussex PO19 1UD, England, 2001.

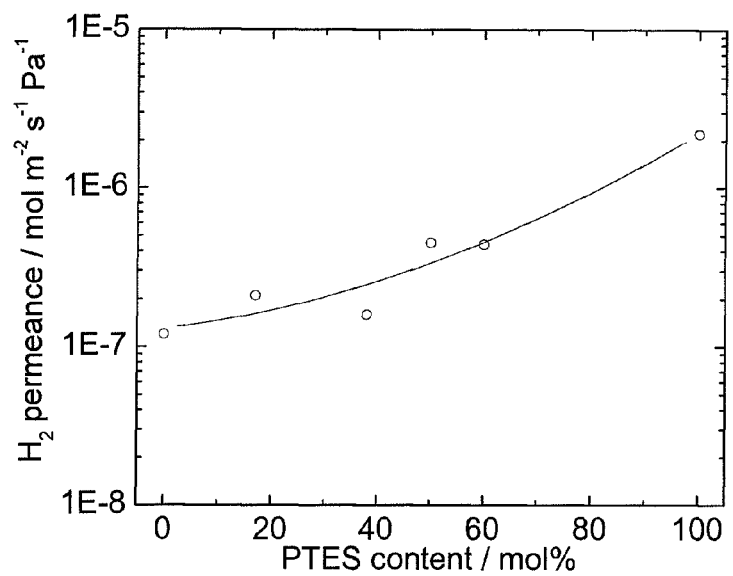
FIG. 14. Graph of $H_2$ permeance through the membranes prepared from the mixed Si source containing different PTES content.

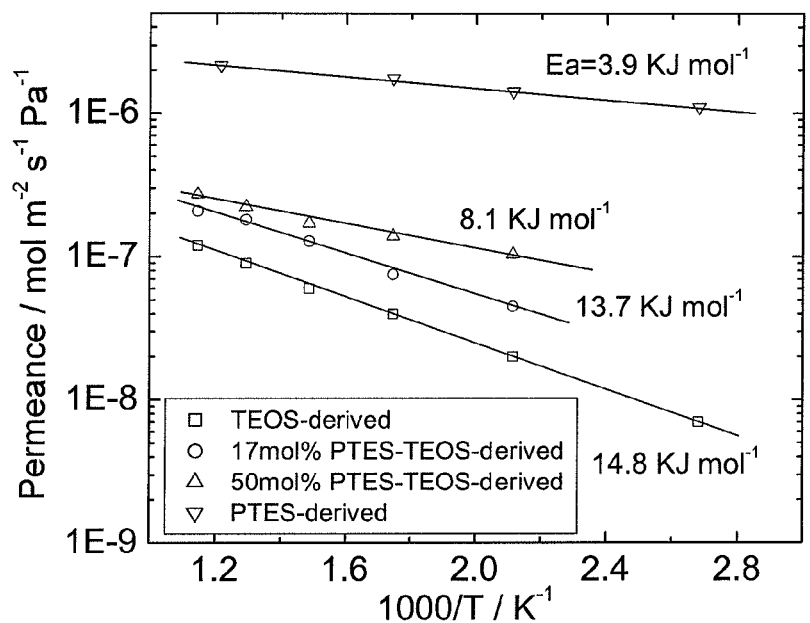
FIG. 15. Arrhenius plots for the permeance of $H_2$ through the PTES-derived membrane, PTES-TEOS-derived membranes and TEOS-derived membrane.

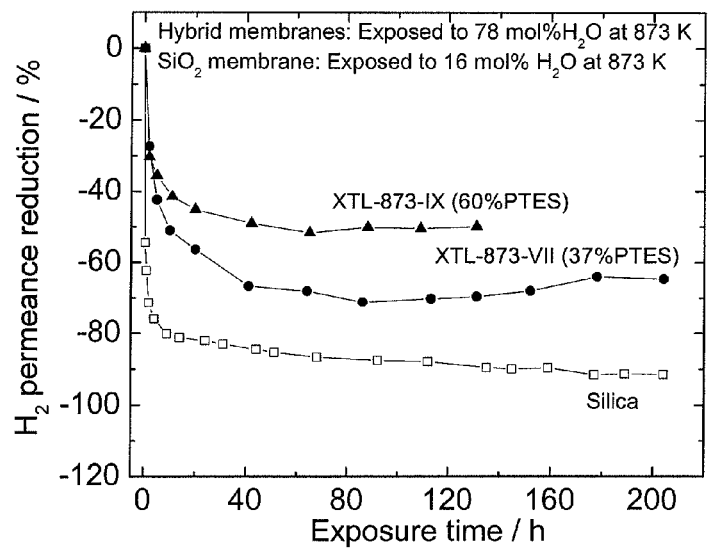
FIG. 16. Graph of changes of the $H_2$ permeance through two PTES-TEOS derived membranes and one silica membrane with the exposure time during. The hybrid membranes were exposed at 873 K to 78 mol% water vapor, while the silica membrane was exposed at 873 K to 16 mol% water vapor.

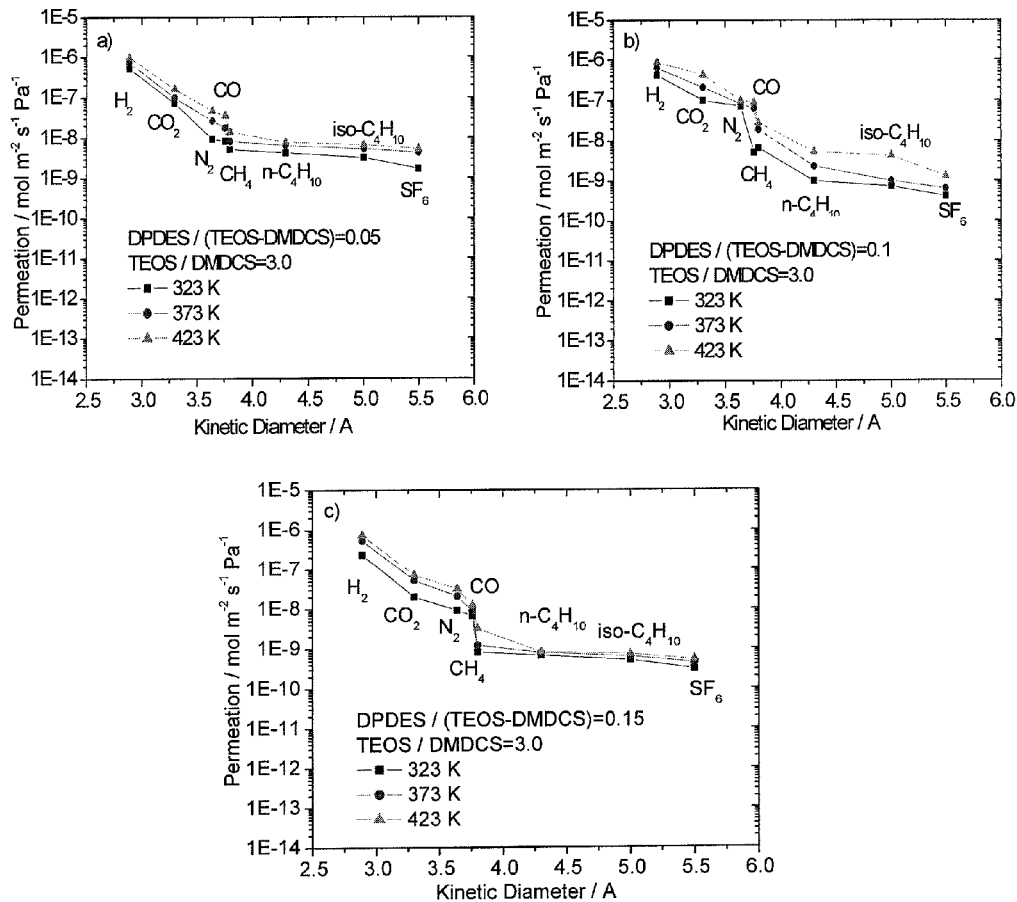
Figure 17. Permeation rates of various gases depending on size of the permeating gases
a) DPDES/(TEOS-DMDCS) = 0.05,
b) DPDES/(TEOS-DMDCS) = 0.1,
c) DPDES/(TEOS-DMDCS) = 0.15

HYBRID ORGANIC-INORGANIC GAS SEPARATION MEMBRANES

CROSS-REFERENCE TO RELATED APPLICATIONS

This application claims the benefit of U.S. provisional patent application Ser. No. 61/028,517, filed Feb. 14, 2008.

STATEMENT REGARDING FEDERALLY SPONSORED RESEARCH OR DEVELOPMENT

None

FIELD OF THE INVENTION

Membranes may be defined as thin, solid materials that permit the selective transport of certain chemical species over others. This invention relates to hybrid organic-inorganic membranes for the separation of carbon dioxide or hydrogen from methane and other gases such as nitrogen. The composite membrane may comprise an amorphous porous layer being disposed on a porous substrate by chemical vapor deposition. Specifically, the invention comprises single top-layer, multiple top-layers, or mixed top-layer silica membranes incorporating aromatic groups deposited on a porous substrate by chemical vapor deposition of gaseous precursors. The invention also concerns methods for preparing such composite membranes.

BACKGROUND OF THE INVENTION

As energy prices rise, gas separation membrane technology has been receiving increasing attention because of its potential for reducing the environmental impact and costs of industrial processes. Gas separation membranes offer a number of benefits over other gas separation technologies such as low energy consumption and process simplicity because separation by membranes do not require a phase transformation.

Polymeric membranes are the most widely used commercially for gas separations. These membranes are generally highly selective but poorly permeable. In comparison inorganic membranes are highly permeable but poorly selective. For better results hybrid materials in which polymers and ceramics are dispersed at a molecular level have been investigated as gas separation membranes. The resulting hybrid membranes can sometimes retain the desirable properties of each material, for example, the flexibility and selectivity of polymers and the thermal stability of ceramics. There are several studies that have attempted to introduce organic functionalities on inorganic membrane surfaces to increase interactions with a particular gas. The introduction of organic functional groups sometimes also contributes to the modification of the molecular structure of the material, which results in favorable selectivity or permeability.

Hybrid organic-inorganic membranes are generally prepared by sol-gel methods because the low temperature processing chemistry allows the introduction of organic molecules inside an inorganic network. Okui et al. [T. Okui et al., J. Sol-Gel Sci. Technol. 5(1995) 127] used the sol-gel and dip-coating technique to prepare a porous hybrid membrane composed of silica incorporating phenyl functional groups at 523 K on α-alumina porous substrates (mean pore size=0.7 µm). Tetramethoxysilane (TMOS, $Si(OC_3H_3)_4$) and phenyltrimethoxysilane (PTMOS, $C_6H_5$—$Si(OCH_3)_3$) were the starting chemicals. Also, other functional groups such as methyl, propyl, 3-chloropropyl, 3,3,3-trifluoropropyl and octadecyl were introduced to study how changes in the affinity of these functional groups for permeating gases affects the permeation properties of the resulting materials. Among these organic functional groups, it was found that phenyl groups have the strongest affinity for $CO_2$. Thus, silica membrane with phenyl groups had the best separation performance with values of permselectivity of 6.0 and 4.5 for $CO_2$/$N_2$ and $CO_2$/$CH_4$, with $CO_2$ permeance of around $6.0 \times 10^{-8}$ mol $m^{-2}$ $s^{-1}$ $Pa^{-1}$ at 298 K (calculated from the reported permeability coefficient of 6.7 cc (STP) cm $cm^{-2}$ $s^{-1}$ cm $Hg^{-1}$ and a thickness of 3-4 µm). It was also reported that the phenyl group in the hybrid membrane remained undamaged at 723 K. Smaihi et al. [M. Smaihi et al., J. Membr. Sci. 116(1996) 211] obtained an organic-inorganic gas separation membrane using a porous substrate and a thin organic-inorganic sol-gel layer as a permselective coating. These permselective layers were obtained by co-hydrolysis of tetramethoxysilane (TMOS) and phenyltrimethoxysilane (PTMOS) or diphenyldimethoxsilane (DPMOS, $(C_6H_5)_2$—$Si(OCH_3)_2$), followed by calcination at 773 K. It was found that TMOS-DPMOS derived membranes exhibited higher permeance but selectivities in the Knudsen regime with $CO_2/N_2$=0.8, while TMOS-PTMOS derived membranes with contents of PTMOS above 70 mol % showed much higher selectivity, around 15 for $CO_2/N_2$. The $CO_2$ permeance through a 54% PTMOS-TMOS derived membrane was $6.0 \times 10^{-6}$ mol $m^{-2}$ $s^{-1}$ $Pa^{-1}$ at 298 K while the selectivity of $CO_2/N_2$ was 4.0.

Another approach to enhance gas separation has been to prepare membranes containing large micropores by burning out functional groups attached to the silica. With plain silica membranes prepared by the decomposition of tetraethylorthosilicate (TEOS) [A. K. Prabhu, S. T. Oyama, J. Membr. Sci. 176 (2000) 233; S. Yan et al, Ind. Eng. Chem. Res. 33 (1994) 2096; H. Y. Ha et al. J. Membr. Sci. 85 (1993) 279], a microstructure is formed that allows the separation of small gaseous species like He and $H_2$ from other gases. However, a silica membrane obtained by pyrolysis of phenyltriethoxysilane (PTES) or diphenyldiethoxysilane (DPDES) showed good $CO_2$ separation [B. K. Sea et al. J. Membr. Sci., 130 (1997) 41]. This silica membrane was prepared on a porous alumina support first by chemical vapor deposition (CVD) using PTES or DPDES as the Si source at 773 K with the aid of evacuation, and then by calcination of the as-produced membrane in air at 673 K for 5 hours to remove the phenyl groups. The phenyl groups of PTES or DPDES remained unreacted under the CVD conditions at 773 K and decreased the silica cross-link density, thus leading to a loose amorphous structure after subsequent calcination. The DPDES-derived membrane had micropores larger than those of the TEOS-derived membrane, giving rise to a higher $CO_2$ permeance of $8.1 \times 10^{-8}$ mol $m^{-2}$ $s^{-1}$ $Pa^{-1}$ at 298 K with a $CO_2$/$CH_4$ selectivity of 11, in comparison to a permeance of $3.6 \times 10^{-10}$ mol $m^{-2}$ $s^{-1}$ $Pa^{-1}$ and a selectivity of 0.66 for the TEOS-derived silica membrane.

SUMMARY OF THE INVENTION

One aspect of the invention discloses a composition comprising a hybrid composite organic-inorganic membrane. The hybrid organic-inorganic membrane according to the present invention may comprise an amorphous porous layer incorporating organic functionalities. The amorphous porous layer may further comprise silica. The amorphous porous layer may be deposited on a porous substrate by chemical vapor deposition (CVD) in an atmosphere where the precursor concentration ranges from 1 to 100 volume % of the gas mixture at high temperature.

The organic functionalities according to the present invention may comprise at least one group selected from the groups consisting of aromatic groups, aliphatic groups, olefinic groups, alicyclic groups, heteronuclear groups, and any mixture thereof. The organic functionalities may comprise aromatic groups obtained from decomposition of phenyl-substituted silanes or siloxanes. The aromatic group may be obtained from the decomposition of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any mixture thereof.

The silica according to the present invention may be formed from at least one silica precursor selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, phenyl-substituted silanes or siloxanes, and any mixture thereof. The silica may also be formed from at least one silica precursor selected from the group consisting of alkoxides of silicon, chlorosilanes, and any mixture thereof. The alkoxides of silicon may include tetramethylorthosilicates (tetramethoxysilanes), tetraethylorthosilanes (tetraethoxysilanes) and tetrapropylorthosilanes (tetrapropoxysilanes). The chlorosilanes may include chloro-, dichloro-, trichloro-methylsilanes, ethylsilanes, and propylsilanes.

The amorphous porous layer according to the present invention may comprise a single top-layer (STL) made by the decomposition of a silica precursor selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, any phenyl-substituted silanes or siloxanes, and any mixture thereof.

The amorphous porous layer according to the present invention may comprise multiple top-layers (MTL) prepared by successive use of a phenyl group precursor, a silica precursor, and any mixture thereof. The phenyl group may be selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, any phenyl-substituted silanes or siloxanes, and any combination thereof. The silica precursor may be selected from the group consisting of alkoxides of silicon, chlorosilanes, and the mixture thereof.

The amorphous porous layer according to the present invention may comprise mixed top-layers (XTL) obtained from the simultaneous use of two or more different silica precursors selected from a first group, a second group, and any mixture thereof. The first group may conprise of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, any phenyl-substituted silanes or siloxanes, and any combination thereof. The second group may conprise alkoxides of silicon, chlorosilanes, and the mixture thereof.

The porous substrate according to the present invention may comprise at least one layer selected from the group consisting of alumina, titania, silica, zirconia, boria, perovskites, spinels, pyrochlores, zeolites, stainless steel, and any combination thereof. The porous substrate may comprise a single layer of alumina prepared by coating a mesoporous support with a single dilute sol dipping solution followed by a calcination step.

The porous substrate may comprise multiple graded layers of alumina, with a gradually decreasing pore size structure, prepared by coating a macroporous support with a series of dilute sol dipping solutions containing boehmite sols of different particle followed by a calcination step.

An embodiment of a hybrid membrane according to the current invention exhibits a high permeance of greater than $1.0\times10^{-7}$ mol m$^{-2}$ s$^{-1}$Pa$^{-1}$ for $H_2$ at 873 K and the selectivity of greater than 9 with respect to gases selected from the group consisting of $CH_4$ and $CO_2$ for $H_2$.

An embodiment of a hybrid membrane according to the current invention exhibits the permeance at 273-403 K for $CO_2$ of greater than $1.0$-$3.0\times10^{-8}$ mol m$^{-2}$ s$^{-1}$Pa$^{-1}$ and the selectivity for $CO_2$ with respect to $CH_4$ of greater than 12-59.

An embodiment of a hybrid membrane according to the current invention exhibits the selectivity for $H_2$ that is from 27 to 56 with respect to $CH_4$ at 873K, 9.4 to 26 with respect to $CO_2$ at 873K, and the permeance for $H_2$ of greater than $1.0\times10^{-7}$ mol m$^{-2}$ s$^{-1}$Pa$^{-1}$ at 873K.

An embodiment of a hybrid membrane according to the current invention exhibits the selectivity for $CO_2$ which is from 380 to 12 with respect to $CH_4$ from 273K to 403 K, respectively, and the permeance for $CO_2$ of greater than $3.4\times10^{-8}$ to $8.7\times10^{-8}$ mol m$^{-2}$ s$^{-1}$Pa$^{-1}$ from 273 K to 403 K, respectively.

An embodiment of a hybrid membrane with a single top-layer is a membrane made by the decomposition of phenyltriethoxysilane (PTES). This membrane exhibits a high permselectivity for carbon dioxide over methane of 26-380, with a permeance of carbon dioxide of $1.0$-$3.0\times10^{-8}$ mol m$^{-2}$s$^{-1}$Pa$^{-1}$ at 273-403 K.

An embodiment of a hybrid membrane with multiple top-layers (MTL) is a membrane made from the sequential decomposition of PTES and tetraethylorthosilicate (TEOS). The permeance of this membrane for $H_2$ is greater than $1.0$-$2.0\times10^{-6}$ mol m$^{-2}$ s$^{-1}$Pa$^{-1}$ at 773-823 K, and the selectivity of this membrane for $H_2/CH_4$ is greater than 6-10.

An embodiment of a hybrid membrane with mixed top-layers (XTL) is a membrane made by the simultaneous decomposition of PTES and TEOS. The permeance of said membrane for $H_2$ is greater than $1.0\times10^{-7}$ mol m$^{-2}$ s$^{-1}$Pa$^{-1}$ at 873K, and the selectivity for $H_2/CH_4$ and $H_2/CO_2$ are about 56 and 26, respectively. This membrane also has excellent stability to water vapor at high temperatures, the permeance of said membrane for $H_2$ reduces 30% to 70% after said membrane being exposed at 873K to 78 mol % water vapor for 2 to 200 hours.

Another aspect of the invention discloses a method for preparing a hybrid composite organic-inorganic membrane. The method according to the present invention may comprise a step of providing an amorphous porous layer incorporating organic functionalities. The method may further comprise a step of providing a porous substrate. The amorphous porous layer may be deposited on a porous alumina substrate by chemical vapor deposition (CVD) in an atmosphere where the precursor concentration ranges from 1 to 100 volume % of the gas mixture at high temperature.

BRIEF DESCRIPTION OF THE DRAWINGS

Certain embodiments of the present invention are described in detail below with reference to the enclosed figures, wherein:

FIG. 1 is a graph of particle size distributions of three boehmite sols with a median particle size of 40, 200 and 630 nm. These sols were used to prepare the gamma-alumina multilayer substrate.

FIG. 2 is a schematic of dip-coating machine for use in preparation of gamma-alumina substrates.

FIG. 3 is a schematic of a suitable CVD apparatus for use in the deposition of hybrid organic-inorganic layers.

FIG. 4 is a graph of permeation properties at different temperatures for the $CO_2$-selective hybrid membrane STL-823-II prepared at 823 K using CVD condition II with a medium PTES concentration of 0.19 mol m$^{-3}$.

FIG. 5 is a graph of permeation properties at different temperatures for the $CO_2$-selective hybrid membrane STL-823-I prepared at 823 K using CVD condition III with a low PTES concentration of 0.11 mol m$^{-3}$.

FIG. 6. is a graph of permeation properties at different temperatures for the $CO_2$-selective hybrid membrane STL-773-I prepared at a low deposition temperature of 773 K using CVD condition I with a low PTES concentration of 0.11 mol m$^{-3}$.

FIG. 7 is a graph of permeation properties at different temperatures for the $CO_2$-selective hybrid membrane STL-873-II prepared at a high deposition temperature of 873 K using CVD condition II with a medium PTES concentration of 0.19 mol m$^{-3}$.

FIG. 8 is a graph of permeation properties at different temperatures for the $CO_2$-selective hybrid membrane STL-823-IV prepared at 823 K using CVD condition IV. Diphenyldiethoxysilane (DPDES) was used as the Si source.

FIG. 9 is a graph of permeances at different temperatures (473, 373 and 323 K) for different gas molecules through the $CO_2$-selective hybrid membrane STL-823-II. The membrane was prepared at 823 K with a medium PTES concentration of 0.19 mol m$^{-3}$.

FIG. 10 is a graph of permeances at different temperatures (373 and 323 K) for different gas molecules through the $CO_2$-selective hybrid membrane STL-823-IV. The membrane was prepared at 823 K with a medium DPDES concentration of 0.19 mol m$^{-3}$.

FIG. 11 is a graph of changes of permeance through the $CO_2$-selective hybrid membrane STL-823-II after calcination in different environments.

FIG. 12 is a cross-sectional image of a hybrid membrane formed on a mesoporous alumina tube.

FIG. 13 is a FTIR spectra of the DPDES and PTES membrane samples and references.

FIG. 14 is a graph of $H_2$ permeance through the membranes prepared from the mixed Si source containing different PTES amounts.

FIG. 15 is an Arrhenius plot of the permeance of $H_2$ through the PTES-derived membrane, PTES-TEOS-derived membranes and TEOS-derived membrane.

FIG. 16 is a graph of changes of the $H_2$ permeance through two PTES-TEOS derived membranes and one silica membrane with exposure time to $H_2O$. The hybrid membranes were exposed at 873 K to 78 mol % water vapor, while the silica membrane was exposed at 873 K to 16 mol % water vapor. R is the ratio of PTES to TEOS.

FIG. 17 is a graph of permeation rates of various gases depending on size of the permeating gases.

DETAILED DESCRIPTION OF THE PREFERRED EMBODIMENTS

The thin and defect-free hybrid membranes (silica with attached aromatic groups) of the present invention were formed on an intermediate alumina substrate which could be a single layer placed on a mesoporous alumina support or a multilayer with a gradually decreasing pore size structure placed on a macroporous alumina support. The intermediate alumina substrate was prepared by coating a mesoporous support with a single dilute sol dipping solution or by coating a macroporous support with a series of dilute sol dipping solutions containing boehmite sols of different particle sizes. Each coating step was followed by a calcination step.

Boehmite sols with different particle size were prepared by carefully controlling the hydrolysis of aluminum alkoxides and the subsequent acid peptization of the boehmite precipitate obtained. The general procedure for preparing boehmite sols was as follows. A quantity of 0.2 mol of aluminum isopropoxide (Aldrich, 98+%) was added to 300 ml of distilled water at room temperature. The mixture was quickly heated to 353 K within 0.5 hour with high speed stirring and was maintained at this temperature for 3-24 h for the hydrolysis of the isopropoxide and the formation of a boehmite (AlOOH) precipitate. The precipitate was then heated to 365 K and was peptized using a quantity of acetic acid (GR, 99.7%) with a molar ratio of $H^+$/Alkoxide in the range of 0.04-0.15. Peptization refers to the breakup of large oxide precipitate particles by acid treatment. The solution was refluxed at 365 K for 20 hour to get a clear or slightly translucent sol. The concentration of the resulting boehmite sols was calculated from the volume of the liquid and the known quantity of isopropoxide used. A dynamic light scattering analyzer (Horiba Model LB-500) was used to measure the particle size of the boehmite sols: These sols remained stable for more than 3 months. Three boehmite sols with a median particle size of 40, 200 and 630 nm were used in the present invention to prepare the gamma-alumina multilayer support. FIG. 1 shows the particle size distributions of these three boehmite sols.

A thin and defect-free intermediate ungraded substrate with one layer of gamma-alumina employed in the present invention was prepared on a mesoporous gamma-alumina support by the dipping-calcining method described in U.S. patent (S. T. Oyama, Y. Gu, D. Lee; U.S. Pat. No. 7,279,325 Feb. 20, 2007). The dip-coating of the support was carried out with a dilute dipping solution containing boehmite sols of particle sizes of 40 nm. A commercial alumina membrane tube (PALL Corporation, Membralox® TI-70-25G Membrane Tube, I.D.=7 mm, O.D.=10 mm) with a nominal pore size of 5 nm was used as the support. The preparation involved several steps. First, the alumina tube was cut to a length of 3-4 cm with a diamond saw and was connected to non-porous alumina tubes at both ends with ceramic joints. The ceramic joints were made with a glaze (Duncan IN 1001) fired at 1153 K for 0.5 h. Second, a dilute dipping solution was prepared by mixing a boehmite sol with a polyvinyl alcohol (PVA, M.W.=72,000) solution and diluting with distilled water to obtain a 0.15 M concentration of the sol and a 0.35 wt. % concentration of the PVA. Third, the alumina support was dipped into the dipping solution and was withdrawn after 10 seconds at a rate of 0.01 m s$^{-1}$ using a motor-driven dip-coating machine. The machine was built in-house and used a stepping motor drive (FIG. 2). Fourth, the dip-coated alumina was dried in ambient air for 12-24 h, and then was heated to 873-923 K in air at a rate of 1 K min$^{-1}$ and calcined at 873-923 K for 2-5 h.

A thin and defect-free gamma-alumina graded multilayer substrate employed in the present invention was prepared on a macroporous alpha-alumina support by the dipping-calcining method similar to the one described in U.S. patent (S. T. Oyama, Y. Gu, D. Lee; U.S. Pat. No. 7,279,325 Feb. 20, 2007). The dip-coating of the substrate was carried out with three dilute dipping solutions containing boehmite sols of different particle sizes. A commercial alumina membrane tube (PALL Corporation, Membralox® TI-70-25Z Membrane Tube, I.D.=7 mm, O.D.=10 mm) with a nominal pore size of 100 nm was used as the substrate. The preparation involved the same steps as for the one-layer intermediate substrate described above except that the dipping and calcination steps were repeated three times using dipping solutions containing boehmite sols of progressively smaller particle sizes. The boehmite sols had particle sizes of 630, 200 and 40 nm.

The hybrid organic-inorganic membranes with a single top-layer (STL) were prepared as follows. The silica top-layer incorporating aromatic groups of the present invention was placed on top of the previously described gamma-alumina substrates by the deposition of a thin silica layer with attached aromatic groups by the chemical vapor deposition (CVD) method. The chemicals used in the CVD step were phenyltriethoxysilane (PTES) or diphenyldiethoxysilane (DPDES), and were decomposed at high temperature in an atmosphere where the precursor concentration ranges from 1 to 100 volume % of the gas mixture.

The setup is shown in FIG. 3, and the CVD process parameters are listed in Table 1. The support covered with the gamma-alumina intermediate layers was installed concentrically inside a piece of glass tubing of 14 mm inside diameter using machined Swagelok fittings with Teflon ferrules. After placing the assembly in an electric furnace and heating it to 773-873 K at a heating rate of 1 K min$^{-1}$, an argon gas flow (balance gas) was introduced on the outer shell side and an argon gas flow (flush gas) was passed on the inner tube side. After 30 minutes the flush gas flow was stopped and a carrier gas flow containing PTES or DPDES was introduced to the inside of the support. The PTES or DPDES were introduced through a bubbler maintained in a temperature range of 356-371 K. The deposition time was varied from 8 to 78 h. After the CVD process was finished, the assembly was purged with the balance and flush gas flows for 30 minutes: Gas permeation measurements were generally conducted at 298-873 K by admitting the pure gases (He, $H_2$, Ne, $CO_2$, $N_2$, CO, $CH_4$, n-butane, iso-butane and $SF_6$) at a certain pressure (higher than atmospheric pressure) into the inner tube side, one end of which was closed, and measuring the quantity of gas flowing from the outer tube. The membranes were found to have high $CO_2/CH_4$ selectivities.

The hybrid organic-inorganic membranes with multiple top-layers (MTL) were prepared as follows. The preparation involves two steps. First, a layer of hybrid membrane was prepared using the previously described gamma-alumina substrates by CVD of phenyltriethoxysilane (PTES) or diphenyldiethoxysilane (DPDES) at 873 K for 8-16 h in the same manner as previously described. Second, this layer was used as a substrate on which was deposited a thin layer of silica by the CVD of tetraethylorthosilicate (TEOS) at high temperature as described in the following U.S. patent (S. T. Oyama, A. Prabhu U.S. Pat. No. 6,527,833, Mar. 4, 2003). The setup is shown in FIG. 3. Second, the as-prepared hybrid membrane was used as the substrate, and was placed with another deposition of TEOS. The process parameters for CVD of TEOS are listed in Table 2. After the assembly was purged with the balance and dilute gas flows for 30 minutes, a TEOS carrier gas flow was passed through a bubbler filled with TEOS at 296 K and was premixed with the dilute argon gas flow before introduction to the inside of the support. The dilute argon gas line here was the same as the flush argon gas line described in the previous preparation of the hybrid membranes with a single top-layer. The deposition time was varied from 4 to 8 hours. After the CVD process was finished, the assembly was purged with the balance and dilute gas flows for 30 minutes. Gas permeation measurements were generally conducted at 873 K with $H_2$, $CH_4$. and $CO_2$ by the same method described previously. The selectivities for $H_2/CH_4$ and $H_2/CO_2$ were calculated as the ratio of the single-gas permeances of $H_2$ to $CH_4$ and $CO_2$.

The hybrid organic-inorganic membrane with mixed top-layers (XTL) were prepared as follows. The membranes used as substrates the same combination of intermediate gamma-alumina layers on top of a macroporous support that were described previously. A thin mixed layer was placed on this substrate by a dual-component CVD method. This process places a silica layer incorporating aromatic groups on the surface of the substrate by the simultaneous thermal decomposition of TEOS and PTES or DPDES at high temperature. The setup is shown in FIG. 3, and the CVD process parameters are listed in Table 3. The support covered with the gamma-alumina layers was installed as shown in the figure and was heated to 873 K as described previously. An argon gas flow was introduced on the outer shell side and a dilute argon gas flow was passed on the inner tube side. After 30 minutes a TEOS carrier gas flow was passed through a bubbler filled with TEOS at 296 K and a separate PTES carrier gas flow was passed through a bubbler filled with PTES at a higher temperature in the range of 331-356 K. The two carrier gases were then premixed with the dilute Ar flow before introduction to the inside of the support. The molar percent of PTES in the Si source can be adjusted by carefully controlling the flow rates of the carrier gases and the temperature of PTES. The deposition time was 3 hours. After the CVD process was finished, the assembly was purged with the balance and dilute gas flows for 30 minutes. Gas permeation measurements were generally conducted at 873 K for H2, $CH_4$ and CO2 by the same method described previously. The selectivities of $H_2/CH_4$ and $H_2/CO_2$ were calculated as the ratio of the single-gas permeances of $H_2$ to $CH_4$ and $CO_2$.

The cross-sectional microstructure of the hybrid membrane was characterized using a field emission scanning electron microscope (FESEM Leo 1550). The samples were sputtered with gold before measurement with the electron microscope. The thickness of the membranes was obtained from high resolution cross-sectional images.

Hydrothermal stability tests were carried out on the hybrid membranes under an argon flow containing 78 mol % water vapor at 873 K up to 200 h. First, an argon flow at 15 µmol s$^{-1}$ (flow rates in µmol$^{s-1}$ can be converted to cm$^3$ (NTP) min$^{-1}$ by multiplication by 1.5) was passed through a heated bubbler containing distilled water and was then introduced on the inner side of the membrane tube to directly contact the fresh as-prepared membranes, while another argon flow also at 15 µmol$^{s-1}$ was maintained on the outer shell side. The $H_2$ permeation rate was measured periodically during the hydrothermal stability test to monitor the changes in the permeance. To make the measurements water vapor was shut off for about 30 min to dry the membranes under a dry argon flow. The wet argon flow was resumed immediately after the permeance measurements.

TABLE 1

CVD Process parameters for the preparation of single top-layer (STL) hybrid membranes (CVD temperature was varied between 773-873 K)

|  | CVD condition code | | | |
| --- | --- | --- | --- | --- |
|  | Cond. I | Cond. II | Cond. III | Cond. IV |
| Si source | PTES | PTES | PTES | DPDES |
| Si source bath temperature (K) | 356 | 365 | 371 | 408 |
| Si source carrier gas flow rate ($\mu$mol s$^{-1}$) | 17.3 | 17.3 | 17.3 | 17.2 |
| Flush gas flow rate ($\mu$mol s$^{-1}$) | 17.3 | 17.3 | 17.3 | 17.2 |
| Balance gas flow rate ($\mu$mol s$^{-1}$) | 17.3 | 17.3 | 17.3 | 17.2 |
| Si source concentration (mol m$^{-3}$) | 0.11 | 0.19 | 0.26 | 0.19 |

TABLE 2

CVD process parameters for the deposition of the topmost silica layer in the multiple top-layer (MTL) hybrid membranes

|  | CVD condition code Condition V |
| --- | --- |
| TEOS bath temperature (K) | 296 |
| TEOS carrier gas flow rate ($\mu$mol s$^{-1}$) | 3.7 |
| Dilute gas flow rate ($\mu$mol s$^{-1}$) | 13.5 |
| Balance gas flow rate ($\mu$mol s$^{-1}$) | 17.2 |
| TEOS concentration (mol m$^{-3}$) | 0.0193 |
| CVD temperature (K) | 873 |

TABLE 3

CVD process parameters for the preparation of the mixed top-layer (XTL) hybrid membranes (CVD temperature was always at 873 K)

|  | CVD condition code | | | |
| --- | --- | --- | --- | --- |
|  | Cond. VI | Cond. VII | Cond. VIII | Cond. I |
| PTES bath temperature (K) | 331 | 348 | 356 | 356 |
| TEOS bath temperature (K) | 296 | 296 | 296 | 296 |
| PTES carrier gas flow rate ($\mu$mol s$^{-1}$) | 3.4 | 3.4 | 3.4 | 4.7 |
| TEOS carrier gas flow rate ($\mu$mol s$^{-1}$) | 4.3 | 4.3 | 4.3 | 4.1 |
| Dilute gas flow rate ($\mu$mol s$^{-1}$) | 12.3 | 12.3 | 12.3 | 10.3 |
| Balance gas flow rate ($\mu$mol s$^{-1}$) | 20.0 | 20.0 | 20.0 | 19.1 |
| PTES concentration × 10$^3$ (mol m$^{-3}$) | 3.88 | 11.9 | 19.2 | 27.5 |
| TEOS concentration × 10$^3$ (mol m$^{-3}$) | 19.3 | 19.3 | 19.3 | 19.3 |
| PTES content (mol %) | 17 | 37 | 50 | 60 |

Example 1

This example describes the synthesis of boehmite sols and the corresponding dipping solutions which are used for the preparation of the gamma-alumina substrates. A boehmite sol was prepared by adding 0.2 mol of aluminum isopropoxide (Aldrich, 98+) to a flask with 300 ml of distilled water at room temperature. The mixture was stirred at high speed and heated to 353K. The alkoxide was hydrolyzed at this temperature for 3 or 24 h, and then the temperature of the mixture was raised to 365K after which the flask was opened for 1.5 h to allow volatilization of the alcohol. The flask was then closed again and the solution was stirred at 365 K for 1 h with refluxing. Then, a quantity of acetic acid (GR, 99.7%) was added to the solution to give a molar ratio of 0.15, 0.07 or 0.04 of H$^+$/Alkoxide. After peptization at 365 K with refluxing for 20 h, a clear or slightly translucent stable sol solution was obtained. Three boehmite sols with a median particle size of 40, 200 and 630 nm denoted as BS40, BS200 and BS630, respectively were obtained by carefully controlling the synthesis parameters, as listed in Table 4a. The results in Table 4a demonstrate that long hydrolysis times and low acid concentrations produce larger sol particles. Due to the relatively long time of peptization, these colloid sols have a narrow particle size distribution, as shown in FIG. 1. They were found to be stable for more than six months.

The dipping solutions are diluted combinations of the sol solutions and a binder, polyvinyl alcohol (PVA). Three dipping solutions with sol concentrations of 0.15 M were prepared. The dipping solution made using the boehmite sol BS40 with median particle size of 40 nm described in Example 1 was designated as DS40. 400 ml of the dipping solution DS40 were prepared as follows. First, 3.5 g of PVA (Fluka, M.W.=72,000) and 5 ml of 1 M HNO$_3$ were added to 95 ml of boiling water with vigorous stirring and refluxing. After 4 h, a clear solution with a PVA weight concentration of 3.5% was obtained. Then, 77 ml of 0.80 M boehmite sot BS40 were vigorously mixed with 283 ml of distilled water and 40 ml of the 3.5 wt % PVA solution were added and refluxed at 323 K for 2 h. The final concentrations of PVA and boehmite sol were 0.35 wt % and 0.15 M. The solution was cooled to room temperature at quiescent conditions for 1 h and was set aside for the preparation of the gamma-alumina membranes.

Dipping solutions DS630 and DS200 were obtained by the same procedure using the boehmite sols BS630 and BS200 with median particle sizes of 630 and 200 nm described previously.

TABLE 4a

Synthesis parameters of boehmite sols with different particle size

| Sample | Hydrolysis time (h) | Molar ratio of H$^+$/Alkoxide | Average median particle size (nm) |
| --- | --- | --- | --- |
| BS40 | 3 | 0.15 | 40 |
| BS20 | 24 | 0.07 | 200 |
| BS63 | 24 | 0.04 | 630 |

Example 2

This example describes the preparation of two kinds of intermediate gamma-alumina substrates. One is the one-layer gamma-alumina substrate made on a mesoporous support. The other is the three-layer-gamma-alumina substrate with a graded structure made on a macroporous support.

The one-layer gamma-alumina substrate was prepared using a commercial alumina membrane tube with a nominal pore size of 5 nm as a support by the deposition of one gamma-alumina layer on top of the support, where the layer was faulted from dipping solution DS40 with a sol particle size of 40 nm. The support was used in sections of 3-4 cm length connected with non-porous alumina tubing at both ends by ceramic joints. A dip-coating method was employed to coat the alumina supports with the sol and binder materials. First, the dipping solution DS 40 containing the boehmite sol with median particle size of 40 nm described in Example 1 was used. The support was dipped at a speed of 0.01 m s$^{-1}$ in the dipping solution DS40, was held for 10 seconds, and was withdrawn at the same speed. Use was made of the mechanical dip-coating machine shown in FIG. 2. The sol-coated tube was dried in ambient air for 24 h and heated to 873 K or 923 K at a heating rate of 1 K min$^{-1}$ and calcined for 5 h or 2 h. The calcination temperature and time depended on the subsequent deposition temperature for the hybrid membranes. A calcinations at 873 K for 5 h was employed when the deposition of hybrid membranes was carried out at 773-823 K, while 923 K for 2 h was used in the case of the deposition of hybrid membranes at 873 K.

The three-layer gamma-alumina substrate was prepared using a commercial alumina membrane tube with a nominal pore size of 100 nm as a support by the deposition of three gamma-alumina layers on top of the support, where the layers were faulted from dipping solutions with decreasing sol particles. The previously described dip-coating method was employed to coat the alumina supports with the sol and binder materials. First, the support was dipped in the dipping solution DS630 containing the boehmite sol with median particle size of 630 nm described in Example 1, and held for 10 seconds. The sol-coated tube was dried in ambient air for 24 h, heated up 923 K at a heating rate of 1 K min$^{-1}$ and calcined for 2 h. Second, the dipping-calcining procedure was repeated using the dipping solution DS200 except for a longer dipping time of 25 seconds. Third, the as-calcined tube was dipped in the dipping solution DS40 and held for 50 seconds. The sol-coated tube was dried in ambient air for 24 h. The calcination temperature and time depended on the subsequent deposition temperature for the hybrid membranes. A calcination at 873 K for 5 h was employed in the case of the deposition temperature at 773-823 K, while 923 K for 2 h was used in the case of the deposition temperature at 873 K. As described in Example 2, the solutions DS630, DS200 and DS40 contained the sols with median particle sizes of 630, 200 and 40 nm, respectively.

Example 3

This example describes the preparation of a single top-layer (STL) hybrid membrane by a chemical vapor deposition (CVD) technique. The hybrid organic-inorganic membrane composed of silica with phenyl groups was deposited on the one-layer alumina substrate calcined at 873 K for 5 hours, as described in Example 2. The CVD process was conducted at 823 K by employing CVD Condition II with a medium Si source concentration as listed in Table 1. The resulting hybrid membrane was designated STL-823-II. The Si source was phenyltriethoxysilane (PTES) vapor and was introduced using a bubbler at 365 K with argon as a carrier gas at a flow rate of 17.3 μmol s$^{-1}$. The PTES flow with a medium concentration of 0.19 mol m$^{-3}$ was passed on the tube (inner) side of the tubular membrane, while a flow of argon at a rate of 17.3 mol m$^{-3}$ was maintained on the shell (outer) side of the reactor assembly. The CVD process was conducted at 823 K for 5, 15, 35 and 78 h with the apparatus shown in FIG. 3. Before and after CVD, the assembly was purged with flows of flush argon gas and balance argon gas at a rate of 17.3 mol m$^{-3}$. The permeation properties at 823 K before and after CVD are listed in Table 4. Before CVD, the permeance follows the order of gas molecular weight, which is $H_2 > CH_4 > CO_2$. The selectivities $CO_2/CH_4$ and $H_2/CH_4$ for the membrane substrate were 0.64 and 2.6, which are close to the values predicated by the Knudsen diffusion mechanism. As the deposition progressed, the permeance declined slightly for all three gases, but relatively faster for $CH_4$, so the selectivity of $CO_2/CH_4$ was increased to above 1. The permeance follows the order of molecular size of $H_2 > CO_2 > CH_4$. The kinetic diameters of $H_2$, $CO_2$ and $CH_4$ were 0.29, 0.33 and 0.38 nm, respectively. After 78 h of deposition, the selectivities of $CO_2/CH_4$ and $H_2/CH_4$ were 1.2 and 6.1, respectively. The $CO_2$ and $H_2$ permeance were high, $4.4 \times 10^{-7}$ and $2.2 \times 10^{-6}$ mol m$^{-2}$ s$^{-1}$ Pa$^{-1}$ at 823 K.

The permeation properties of the STL-823-II membrane were tested at different temperature. Table 5 and FIG. 4 show the $CO_2$ and $CH_4$ permeance and the $CO_2/CH_4$ selectivity at temperatures in the range of 297 K and 823 K (24° C. and 550° C.). The $CO_2$ permeance through the membrane increased with decreasing permeation temperature, and reached a maximum at around 473 K, and then decreased with decreasing temperature. The $CH_4$ permeance had a similar trend, but decreased much faster with decreasing temperature below 473 K, thus leading to a large increase in the selectivity. At 297 K, the $CO_2$ permeance was $5.8 \times 10^{-8}$ mol m$^{-2}$ s$^{-1}$ Pa$^{-1}$ and the $CO_2/CH_4$ selectivity was 380. This membrane had a highest $CO_2$ permeance of $7.2 \times 10^{-7}$ mol m$^{-2}$ s$^{-1}$ Pa$^{-1}$ at 473 K, but it shows the best $CO_2/CH_4$ selectivity at lower temperature, especially in the range of 297-323 K (24-50° C.).

TABLE 4

Gas permeation properties of a single top-layer hybrid membrane before and after CVD at 823 K

| Permeation properties | | 1-layer alumina substrate | Hybrid membrane STL-823-II | | | |
| --- | --- | --- | --- | --- | --- | --- |
| | | | 5 h-CVD | 15 h-CVD | 35 h-CVD | 78 h-CVD |
| Permeance (mol m-2 s$^{-1}$ Pa$^{-1}$) | $H_2$ | $2.5 \times 10^{-5}$ | $9.7 \times 10^{-6}$ | $5.0 \times 10^{-6}$ | $1.5 \times 10^{-6}$ | $2.2 \times 10^{-6}$ |
| | $CH_4$ | $9.7 \times 10^{-6}$ | $3.8 \times 10^{-6}$ | $2.0 \times 10^{-7}$ | $3.6 \times 10^{-7}$ | $3.6 \times 10^{-7}$ |
| | $CO_2$ | $6.2 \times 10^{-6}$ | $2.3 \times 10^{-6}$ | $1.3 \times 10^{-6}$ | $3.2 \times 10^{-7}$ | $4.4 \times 10^{-7}$ |
| Selectivity | $CO_2/CH_4$ | 0.64 | 0.61 | 0.68 | 0.9 | 1.2 |
| | $H_2/CH_4$ | 2.6 | 2.6 | 2.5 | 4.2 | 6.1 |

TABLE 5

$CO_2$ separation at different permeation temperature through the single top-layer hybrid membrane STL-823-II

| Permeation temperature (K) | Permeance (mol m$^{-2}$ s$^{-1}$ Pa$^{-1}$) | | Selectivity |
| --- | --- | --- | --- |
| | $CO_2$ | $CH_4$ | $CO_2/CH_4$ |
| 823 | $4.4 \times 10^{-7}$ | $3.6 \times 10^{-7}$ | 1.2 |
| 573 | $5.5 \times 10^{-7}$ | $3.3 \times 10^{-7}$ | 1.7 |
| 473 | $7.2 \times 10^{-7}$ | $2.6 \times 10^{-7}$ | 2.8 |
| 373 | $3.3 \times 10^{-7}$ | $1.3 \times 10^{-8}$ | 26 |

TABLE 5-continued

CO$_2$ separation at different permeation temperature through the single top-layer hybrid membrane STL-823-II

| Permeation temperature (K) | Permeance (mol m$^{-2}$ s$^{-1}$ Pa$^{-1}$) | | Selectivity |
|---|---|---|---|
| | CO$_2$ | CH$_4$ | CO$_2$/CH$_4$ |
| 323 | $1.0 \times 10^{-7}$ | $1.1 \times 10^{-9}$ | 91 |
| 297 | $5.8 \times 10^{-8}$ | $1.5 \times 10^{-10}$ | 380 |

Example 4

This example describes the preparation of another single top-layer (STL) hybrid membrane deposited on the same one-layer gamma-alumina substrate calcined at 873 K for 5 hours, as described in Example 2. Differing from Example 3, this example used CVD process parameters denoted as Condition I with a low phenyltriethoxysilane (PTES) concentration of 0.11 mol m$^{-3}$ (Table 1). The resulting hybrid membrane was designated STL-823-I. The CVD process was carried out for 10, 20, 30 and 41 hours, respectively in a similar manner as described in Example 3. Table 6 shows the changes in permeation properties at 823 K before and after CVD. After 41 h of deposition, the selectivities of CO$_2$/CH$_4$ and H$_2$/CH$_4$ were doubled and tripled, respectively. The CO$_2$ and H$_2$ permeance were $1.8 \times 10^{-7}$ and $1.1 \times 10^{-6}$ mol m$^{-2}$s$^{-1}$Pa$^{-1}$ at 823 K, a little lower than the membrane STL-823-II in Example 3.

Table 7 and FIG. 5 show the permeances for CO$_2$ and CH$_4$ and the selectivity of CO$_2$ over CH$_4$ at temperatures in the range of 323 K and 873 K (50° C. and 550° C.). Similar to the membrane STL-823-II in EXAMPLE 4, the membrane STL-823-I showed a permeance maximum at 473 K for both CO$_2$ and CH$_4$, and an increasing selectivity of CO$_2$/CH$_4$ with decreasing permeation temperature. At 323 K, the CO$_2$ permeance was $8.9 \times 10^{-8}$ mol m$^{-2}$s$^{-1}$Pa$^{-1}$ and the CO$_2$/CH$_4$ selectivity was 32.

TABLE 6

Gas permeation properties of a single top-layer (STL) hybrid membrane at 823 K before and after CVD

| Permeation properties | | 1-layer alumina substrate | Hybrid membrane STL-823-I | | | |
|---|---|---|---|---|---|---|
| | | | 10 h-CVD | 20 h-CVD | 30 h-CVD | 41 h-CVD |
| Permeance (mol m$-2$ s$^{-1}$ Pa$^{-1}$) | H$_2$ | $2.5 \times 10^{-5}$ | $5.5 \times 10^{-6}$ | $1.6 \times 10^{-6}$ | $1.1 \times 10^{-6}$ | $1.1 \times 10^{-6}$ |
| | CH$_4$ | $9.7 \times 10^{-6}$ | $2.0 \times 10^{-6}$ | $4.1 \times 10^{-7}$ | $1.5 \times 10^{-7}$ | $1.4 \times 10^{-7}$ |
| | CO$_2$ | $6.2 \times 10^{-6}$ | $1.3 \times 10^{-6}$ | $3.2 \times 10^{-6}$ | $1.7 \times 10^{-7}$ | $1.8 \times 10^{-7}$ |
| Selectivity | CO$_2$/CH$_4$ | 0.64 | 0.67 | 0.78 | 1.1 | 1.3 |
| | H$_2$/CH$_4$ | 2.6 | 2.8 | 3.8 | 7.0 | 7.4 |

TABLE 7

CO$_2$ separation at different permeation temperature through the single top-layer (STL) CO$_2$-selective hybrid membrane STL-823-I

| Permeation temperature (K) | Permeance (mol m$^{-2}$ s$^{-1}$ Pa$^{-1}$) | | Selectivity |
|---|---|---|---|
| | CO$_2$ | CH$_4$ | CO$_2$/CH$_4$ |
| 823 | $1.8 \times 10^{-7}$ | $1.4 \times 10^{-7}$ | 1.3 |
| 573 | $3.3 \times 10^{-7}$ | $1.5 \times 10^{-7}$ | 2.2 |
| 473 | $4.6 \times 10^{-7}$ | $1.3 \times 10^{-7}$ | 3.5 |

TABLE 7-continued

CO$_2$ separation at different permeation temperature through the single top-layer (STL) CO$_2$-selective hybrid membrane STL-823-I

| Permeation temperature (K) | Permeance (mol m$^{-2}$ s$^{-1}$ Pa$^{-1}$) | | Selectivity |
|---|---|---|---|
| | CO$_2$ | CH$_4$ | CO$_2$/CH$_4$ |
| 373 | $2.1 \times 10^{-7}$ | $9.6 \times 10^{-9}$ | 21 |
| 323 | $8.9 \times 10^{-8}$ | $2.8 \times 10^{-9}$ | 32 |

Example 5

This example describes the preparation of another single top-layer (STL) hybrid membrane deposited on the same one-layer gamma-alumina substrate calcined at 873 K for 5 hours, as described in Example 2. Differing from Example 3, this example used CVD process parameters denoted as Condition III with a high phenyltriethoxysilane (PTES) concentration of 0.26 mol m$^{-3}$ (Table 1). The resulting hybrid membrane was designated STL-823-III. The CVD process was conducted at 823 K for 5, 11 and 20 hours, respectively in a similar manner as described in Example 3. Table 8 shows the changes in permeation properties at 823 K before and after CVD. After 20 h of deposition, the selectivities of CO$_2$/CH$_4$ and H$_2$/CH$_4$ were improved to 0.95 and 4.1, respectively, and the CO$_2$ and H$_2$ permeance were $2.7 \times 10^{-7}$ and $1.2 \times 10^{-6}$ mol M$^{-2}$ s$^{-1}$ Pa$^{-1}$ at 823 K. The selectivity was not good as in Examples 3 and 4.

TABLE 8

Gas permeation properties of a single top-layer hybrid membrane before and after CVD at 823 K

| Permeation properties | | 1-layer alumina substrate | Hybrid membrane STL-823-III | | |
|---|---|---|---|---|---|
| | | | 5 h-CVD | 11 h-CVD | 20 h-CVD |
| Permeance (mol m$^{-2}$ s$^{-1}$ Pa$^{-1}$) | H$_2$ | $2.5 \times 10^{-5}$ | $9.7 \times 10^{-6}$ | $1.8 \times 10^{-6}$ | $1.2 \times 10^{-6}$ |
| | CH$_4$ | $9.7 \times 10^{-6}$ | $3.2 \times 10^{-6}$ | $5.7 \times 10^{-7}$ | $2.8 \times 10^{-7}$ |
| | CO$_2$ | $6.2 \times 10^{-6}$ | $2.0 \times 10^{-6}$ | $4.1 \times 10^{-7}$ | $2.7 \times 10^{-7}$ |

TABLE 8-continued

Gas permeation properties of a single top-layer hybrid membrane
before and after CVD at 823 K

| Permeation properties | | 1-layer alumina substrate | Hybrid membrane STL-823-III | | |
|---|---|---|---|---|---|
| | | | 5 h-CVD | 11 h-CVD | 20 h-CVD |
| Selectivity | $CO_2/CH_4$ | 0.64 | 0.63 | 0.7 | 0.95 |
| | $H_2/CH_4$ | 2.6 | 3.0 | 3.0 | 4.1 |

Example 6

This example describes the preparation of another single top-layer (STL) hybrid membrane deposited on the same one-layer gamma-alumina substrate calcined at 873 K for 5 hours, as described in Example 2. Differing from Examples 3, 4 and 5, this example used a low deposition temperature of 773 K and the CVD Condition I with a low PTES concentration of 0.11 mol m$^{-3}$ (Table 1). The resulting hybrid membrane was designated STL-773-I. The CVD process was conducted for 10, 15, 25 and 45 hours, respectively in a similar manner as described in Example 3. Table 9 shows the changes in the permeation properties at 823 K before and after CVD. After 45 h of deposition, the selectivities of $CO_2/CH_4$ and $H_2/CH_4$ were improved by 2-5 times, and the $CO_2$ and $H_2$ permeances were $1.8 \times 10^{-7}$ and $1.1 \times 10^6$ mol m$^{-2}$ s$^{-1}$ Pa$^{-1}$ at 783 K.

Table 10 and FIG. 6 show the changes of the permeances for $CO_2$ and $CH_4$ and the selectivity of $CO_2$ over $CH_4$ in the temperature range 303 K-773 K (30° C.-500° C.). Like the membranes deposited at higher temperature of 823 K in Examples 3 and 4, this hybrid membrane formed at lower-temperature had a similar permeance trend with temperature. There was a permeance peak at 473 K. However, in the low temperature range of 303-473 K an opposite selectivity result for $CO_2$ over $CH_4$ was found. At temperatures lower than 473 K, the selectivity decreased with decreasing permeation temperature, leading to a maximum selectivity of 3.2 at 473 K with a $CO_2$ permeance of $3.8 \times 10^{-7}$ mol m$^{-2}$ s$^{-1}$ Pa$^{-1}$.

TABLE 9

Gas permeation properties of a single top-layer (STL) hybrid membrane before and after CVD at 773 K

| Permeation properties | | 1-layer alumina substrate | Hybrid membrane STL-773-I | | | |
|---|---|---|---|---|---|---|
| | | | 10 h-CVD | 15 h-CVD | 25 h-CVD | 45 h-CVD |
| Permeance (mol m-2 s$^{-1}$ Pa$^{-1}$) | H2 | $3.6 \times 10^{-5}$ | $1.6 \times 10^{-6}$ | $1.5 \times 10^{-6}$ | $1.4 \times 10^{-6}$ | $1.4 \times 10^{-6}$ |
| | CH4 | $1.5 \times 10^{-5}$ | $3.6 \times 10^{-7}$ | $2.4 \times 10^{-7}$ | $1.6 \times 10^{-7}$ | $1.3 \times 10^{-7}$ |
| | CO2 | $1.1 \times 10^{-5}$ | $3.0 \times 10^{-7}$ | $2.5 \times 10^{-7}$ | $2.3 \times ^{-7}$ | $2.0 \times 10^{-7}$ |
| Selectivity | $CO_2/CH_4$ | 0.70 | 0.85 | 1.1 | 1.4 | 1.6 |
| | $H_2/CH4$ | 2.4 | 4.5 | 6.2 | 8.9 | 11 |

TABLE 10

$CO_2$ separation at different permeation temperature through
the single top-layer hybrid membrane STL-773-I

| Permeation Temperature (K) | Permeance (mol m$^{-2}$ s$^{-1}$ Pa$^{-1}$) | | Selectivity |
|---|---|---|---|
| | $CO_2$ | $CH_4$ | $CO_2/CH_4$ |
| 773 | $2.0 \times 10^{-7}$ | $1.3 \times 10^{-7}$ | 1.6 |
| 673 | $1.9 \times 10^{-7}$ | $1.0 \times 10^{-7}$ | 1.8 |
| 573 | $2.3 \times 10^{-7}$ | $9.4 \times 10^{-8}$ | 2.4 |

TABLE 10-continued $CO_2$ separation at different permeation temperature through
the single top-layer hybrid membrane STL-773-I

| Permeation Temperature (K) | Permeance (mol m$^{-2}$ s$^{-1}$ Pa$^{-1}$) | | Selectivity |
|---|---|---|---|
| | $CO_2$ | $CH_4$ | $CO_2/CH_4$ |
| 473 | $3.8 \times 10^{-7}$ | $1.2 \times 10^{-7}$ | 3.2 |
| 373 | $1.0 \times 10^{-7}$ | $8.9 \times 10^{-8}$ | 1.2 |
| 303 | $8.3 \times 10^{-8}$ | $9.9 \times 10^{-8}$ | 0.8 |

Example 7

This example describes the preparation of another single top-layer (STL) hybrid membrane deposited on the three-layer gamma-alumina substrate with the third layer calcined at 923 K for 2 h, as described in Example 2. Differing from Examples 3, 4, 5 and 6, this example used a high deposition temperature of 873 K. and the CVD Condition IT with a medium PTES concentration of 0.19 mol m$^{-3}$ (Table 1). The resulting hybrid membrane was designated STL-873-II. The CVD process was conducted for 8 hours in a similar manner as described in Example 3. Table 11 shows the changes in permeation properties at 873 K before and after CVD. After 8 h of deposition, the selectivities of $CO_2/CH_4$ and $H_2/CH_4$ were 1.9 and 20, which are higher compared with the membranes prepared at lower temperature (773-823 K) in Examples 3, 4, 5 and 6. However, the permeance for $CO_2$ and $H_2$ were lower, $8.7 \times 10^{-8}$ and $9.4 \times 10^{-7}$ mold m$^{-2}$ s$^{-1}$ Pa$^{-1}$, respectively at 873 K, even though a shorter deposition time was employed. A shorter deposition time was required because at the higher deposition temperature, the deposition rate was faster.

Table 12 and FIG. 7 show the permeances of $CO_2$ and $CH_4$ and the selectivity of $CO_2$ over $CH_4$ in the temperature range 323 K-873 K (50° C.-600° C.). The permeances for $CO_2$ and $CH_4$ showed a similar trend as the membranes prepared at lower deposition temperatures of 773 K and 823 K in Examples 3, 4, 5 and 6. As the permeation temperature decreased, the permeance increased and then decreased with a peak at around 473 K. Since the permeance of $CH_4$ decreased much faster than that of $CO_2$ with decreasing temperature below 473 K, the selectivity of $CO_2$ over CH.sub.4 increased with decreasing temperature, and jumped at temperatures below 473 K. Compared with the membrane prepared at lower temperature in Examples 3, 4 and 6, the membrane in this example showed a lower $CO_2$ permeance. At 323 K, the $CO_2$ permeance was $1.6 \times 10^{-8}$ mol m$^{-2}$ s$^{-1}$ Pa$^{-1}$ and the $CO_2/CH_4$ selectivity was 180. This membrane had a highest $CO_2$ permeance of $4.7 \times 10^{-7}$ mol m$^{-2}$ s$^{-1}$ Pa$^{-1}$ at 473 K with a $CO_2/CH_4$ selectivity of 10.

TABLE 11

Gas permeation properties of a single top-layer hybrid membrane before and after CVD at 873 K

| Permeation properties | | three-layer alumina substrate | STL-873-II 8 h-CVD |
|---|---|---|---|
| Permeance ($mol\ m^{-2}\ s^{-1}\ Pa^{-1}$) | $H_2$ | $4.5 \times 10^{-5}$ | $9.4 \times 10^{7}$ |
| | $CH_4$ | $1.6 \times 10^{-5}$ | $4.6 \times 10^{-8}$ |
| | $CO_2$ | $9.1 \times 10^{-6}$ | $8.7 \times 10^{-8}$ |
| Selectivity | $CO_2/CH_4$ | 0.58 | 1.9 |
| | $H_2/CH_4$ | 2.8 | 20 |

TABLE 12

$CO_2$ separation at different permeation temperature through the single top-layer (STL) $CO_2$-selective hybrid membrane STL-873-II

| Permeation Temperature (K) | Permeance (mol m$^{-2}$ s$^{-1}$ Pa$^{-1}$) | | Selectivity |
|---|---|---|---|
| | $CO_2$ | $CH_4$ | $CO_2/CH_4$ |
| 873 | $8.7 \times 10^{-8}$ | $4.6 \times 10^{-8}$ | 1.9 |
| 473 | $4.7 \times 10^{-7}$ | $4.6 \times 10^{-7}$ | 10 |
| 373 | $2:6 \times 10^{-7}$ | $1.4 \times 10^{-8}$ | 19 |
| 323 | $1.6 \times 10^{-8}$ | $8.8 \times 10^{-11}$ | 180 |

Example 8

This example describes the preparation of another single top-layer hybrid membrane deposited on the one-layer gamma-alumina substrate calcined at 873 K for 5 hours, as described in EXAMPLE 2. Differing from previous Examples 2, 3, 4, 5, 6 and 7, in this example the silica source employed was diphenyldiethoxysilane (DPDES). The CVD process was conducted at 823 K with CVD Condition IV listed in Table 1. The resulting hybrid membrane was in designated STL-873-IV. The DPDES vapor was introduced using a bubbler at 408 K with argon as a carrier gas at a flow rate of 17.2 µmol s$^{-1}$. The DPDES flow with a medium concentration of 0.19 mol m$^{-3}$ was passed on the tube (inner) side of the tubular membrane, while a flow of argon at a rate of 17.2 mol m$^{-3}$ was maintained on the shell (outer) side of the reactor assembly. The CVD process was conducted for 5 hours. Table 13 shows changes of permeation properties at 823 K before and after CVD. After 5 h of deposition, the permeances for $CO_2$ and $H_2$ were $1.8 \times 10^{-7}$ and $1.1 \times 10^{-6}$ mol m$^{-2}$ s/$^{-1}$ Pa$^{-1}$, respectively at 823 K, and the selectivities of $CO_2/CH_4$ and $H_2/C\ H_4$ were 1.6 and 10. The permeation properties are similar to the membranes prepared at 823 K using PTES in Examples 3 and 4.

Table 14 and FIG. 8 show the changes in permeances for $CO_2$ and $CH_4$ and the selectivity of $CO_2/CH_4$ with different permeation temperatures in the range 299 K-823 K (26° C.-600° C.). The $CO_2$ permeance through the membrane increased with decreasing permeation temperature, and reached a maximum at around 373 K, and then decreased with decreasing temperature. The $CH_4$. permeance had a very similar trend, but decreased much faster with decreasing temperature below 373 K, thus leading to a quick increase of the selectivity below 373 K. At 299 K, the CO2 permeance was $3.4 \times 10^{-7}$ mol m$^{-2}$ s$^{-1}$ Pa$^{-1}$ and the $CO_2/CH4$ selectivity was 59. Compared with the PTES-derived hybrid membrane described in Example 3, the DPDES-derived hybrid membrane had higher CO2 permeance but lower selectivity. On the other hand, the membrane in this example exhibited a highest $CO_2$ permeance of $8.7 \times 10^{-7}$ mol m$^{-2}$ s$^{-1}$ Pa$^{-1}$ at 373 K with a CO2/$CH_4$ selectivity of 12.

TABLE 13

Gas permeation properties of a $CO_2$-selective hybrid membrane before and after CVD at 873 K

| Permeation properties | | one-layer alumina substrate | S1L-823-IV 5 h-CVD |
|---|---|---|---|
| Permeance (mol m$^2$ s$^{-1}$ Pa$^{-1}$) | $H_2$ | $2.5 \times 10^{-5}$ | $1.1 \times 10^{-6}$ |
| | $CH_4$ | $9.7 \times 10^{-6}$ | $1.1 \times 10^{-7}$ |
| | $CO_2$ | $6.2 \times 10^{-6}$ | $1.8 \times 10^{-7}$ |
| Selectivity | $CO_2/CH_4$ | 0.64 | 1.6 |
| | $H_2/CH_4$ | 2.6 | 10 |

TABLE 14

$CO_2$ separation at different permeation temperature through the single top-layer (STL) $CO_2$-selective hybrid membrane STL-823-IV

| Permeation Temperature (K) | Permeance (mol m$^2$ s$^{-1}$ Pa$^{-1}$) | | Selectivity |
|---|---|---|---|
| | $CO_2$ | $CH_4$ | $CO_2/CH_4$ |
| 823 | $1.8 \times 10^{-7}$ | $1.1 \times 10^{-7}$ | 1.6 |
| 573 | $4.6 \times 10^{-7}$ | $2.2 \times 10^{-7}$ | 2.1 |
| 473 | $7.3 \times 10^{-7}$ | $2.2 \times 10^{-7}$ | 3.4 |
| 373 | $8.7 \times 10^{-7}$ | $7.5 \times 10^{-8}$ | 12 |
| 323 | $7.3 \times 10^{-7}$ | $2.4 \times 10^{-8}$ | 30 |
| 303 | $3.4 \times 10^{-7}$ | $5.8 \times 10^{-10}$ | 59 |

Example 9

This example describes the possible permeation mechanism, thermal stability, and morphology of the single top-layer hybrid membranes. FIG. 9 shows the permeances for different gas molecules through the hybrid membrane STL-823-II at 473, 373, 323 K, respectively. The membrane STL-823-II was prepared at 823 K by the CVD of phenyltriethoxysilane (PTES) using CVD condition II, as described in EXAMPLE 3. Ten gases tested include helium (He), hydrogen ($H_2$), neon (Ne), carbon dioxide ($CO_2$), nitrogen ($N_2$), carbon monoxide (CO), methane ($CH_4$), n-butane (n-$C_4H_{10}$), iso-butane (iso-$C_4H_{10}$) and sulfur hexafluoride ($SF_6$). For all gases except for $SF_6$, the permeance increased with increasing permeation temperature, indicating that the permeation mechanism at low temperature is dominated by activated diffusion. At a certain permeation temperature, the permeance generally follows the order of gas molecular size. The smaller the molecule, the faster it passes through the membrane. This implies that the membrane has a molecular sieving function. The sharp difference of permeance at 473 K between $CH_4$ and n-butane indicates a critical size of around 0.4 nm, since the kinetic diameters of $CH_4$ and n-butane are 0.38 and 0.43, respectively. On the other hand, the membrane showed higher permeance for some gases, especially for $CO_2$ at low temperature. At 323 K, the permeance for $CO_2$ was even higher than that for $H_2$, even though the $H_2$ molecule is lighter and smaller than the $CO_2$ molecule. This suggests that surface diffusion contributes to the permeation mechanism for some gases such as $CO_2$ at low temperature. The strong surface flow for $CO_2$ is caused by the strong affinity between the CO$_2$ molecule and the aromatic groups present in the membrane: Therefore, both molecular sieving and surface diffusion make these hybrid membranes highly selective for CO$_2$ over CH$_4$ at low temperature.

FIG. 10 shows the gas permeance as a function of kinetic diameters at 373 and 323 K through the hybrid membrane STL-823-IV. As described in Example 8, the membrane was prepared at 823 K by the CVD of diphenyldiethoxysilane (DPDES) using CVD condition IV listed in Table 1. It can be concluded that the permeation mechanism through the DPDES-derived hybrid membranes at low temperature are also molecular sieving and surface diffusion. The critical size of this hybrid material is also around 0.4 nm. Compared with FIG. 9, it was also found that the surface diffusion flow in the DPDES-derived membrane was stronger than in the PTES-derived membrane, leading to higher permeance at low temperature. At 373 K, the permeance for CO$_2$ through the DPDES-derived membrane was $8.7 \times 10^{-7}$ mol m$^{-2}$ s$^{-1}$ Pa$^{-1}$ in comparison to $3.3 \times 10^{-7}$ mol m$^{-2}$ s$^{-1}$ Pa$^{-1}$ for the PTES-derived membrane.

To investigate the thermal stability of the hybrid membranes, a series of measurements were conducted on a hybrid membrane STL-823-1I prepared using the method described in Example 3. First, the permeances for H$_2$, CO$_2$, CH$_4$ and SF$_6$ were measured at 473 K on the fresh hybrid membrane. Second, the membrane was cooled to room temperature, then heated to 823 K, and then cooled down to room temperature again at a rate of 1 K min$^{-1}$. Some specific temperatures were kept for periods of several hours to one day for other tests. After several cycles for a total of two weeks, the membrane was taken out from the furnace, wrapped with plastic wrapper, and stored at ambient conditions for a month. Then, the membrane was calcined at 823 K for 2 h with flushing Ar and cooled down to 473 K. The permeation measurement was taken again at 473 K using H$_2$, CO$_2$, CH$_4$ and SF$_6$. At last, the same membrane was calcined at 823 K for 2 h in air and the permeance were measured again at 473 K. The results are shown in FIG. 11. The small change in permeance after storage and calcination in Ar indicates good long term stability of the hybrid membranes. Different results were obtained after calcination in air. Here it was found that the permeance increased substantially and the selectivity decreased. This is due to the combustion of the aromatic groups present in the membrane, thus leading to an increase in the pore size of the membrane. It is concluded that the hybrid membranes exhibit good thermal stability except in an oxidative environment.

FIG. 12 is a high-resolution electron micrograph of an STL-823-1I CO$_2$-selective hybrid membrane prepared using the method described in Example 3. There is clearly a thin layer at the very top with a different contrast from the alumina particle layer. This is the hybrid layer, of thickness 30 nm. Careful examination on the alumina layer reveals a separate alumina layer with smaller alumina particles and denser texture. This is the 1-layer alumina substrate with a thickness of 170 nm, which was prepared by dipping-calcination of the boehmite sol. Below the 1-layer alumina substrate is the commercial porous alumina support with a pore size of 5 nm.

FIG. 13 shows Fourier transform infrared (FTIR) spectra of STL membranes with various reference compounds. The membrane samples were obtained by scratching off the membrane material from the support with a stainless steel blade. These and other samples were mixed with KBr and pressed into pellets at 1.4 tons pressure with a hydraulic press (Carver). The F1IR spectra were obtained with a Bio-Rad Model FTS 3000MX instrument at a resolution of 4 cm$^{-1}$ using 64-1024 scans/spectrum. The samples prepared with DPDES (FIG. 13a) and PTES (FIG. 13b) (STL-823-IV and STL-823-1I, respectively) were physically mixed with 4 wt % tetracyanoethylene used as an internal standard.

Comparison of the spectra with the references triphenylphosphine oxide/tetracyanoethylene (FIG. 13c), tetracyanoethylene (FIG. 13d), triphenylphosphine oxide (FIG. 13e), liquid DPDES (FIG. 13f), and liquid PTES (FIG. 13g) allows assignment and quantification of the bands. In the tetracyanoethylene spectrum (FIG. 13d) the peak at 2253 cm$^{-1}$ is due to C$\equiv$N bond stretching, the peak at 2226 cm$^{-1}$ is due to the C$=$C bond stretching, and the peaks at 1152, 1116, and 1089 cm$^{-1}$ are due to C—C bond stretching. In the triphenylphosphine spectrum (FIG. 13e) the broad feature at 3054 cm$^{-1}$ is due to aromatic C—H bonds, the peaks at 1586, 1488, 1434 cm$^{-1}$ are due to aromatic C$=$C stretching, the peaks at 1191 and 1119 Cm-$^1$ due to P$=$O stretching, and the peaks at 1164 and 1074 cm are due to C—C bond stretching. The spectra of liquid DPDES (FIG. 13f) and liquid PTES (FIG. 13g) are very similar. The peaks close to 3066 cm$^{-1}$ are due to aromatic C—H stretches, the peak at 2979 cm$^{-1}$ is due to the C—H stretch of the terminal CH$_3$ group, the peaks at 2925 and 2889 cm$^{-1}$ are due to the C—H stretch in CH$_2$ groups, the peaks at 1593, 1484, 1439, and 1386 cm$^{-1}$ are due to aromatic C$=$C stretching, the peaks at 1170 and 1080 cm$^{-1}$ are due to Si—O—C asymmetric stretches, and the peaks at 1143 and 1098 cm$^{-1}$ are due to C—C stretches.

In the membrane materials the peaks at 1622, 1504, and 1396 cm$^{-1}$ can be assigned to aromatic C$=$C stretches. The liquid DPDES and PTES references show weak aromatic C—H stretches in comparison to the strong aliphatic C—H stretches. In the membrane materials no C—H stretches are visible. This may be due to the weakness of these bands or because the heat treatment in the preparation decomposed the phenyl groups into dehydrogenated graphite-like groups.

The bands in the aromatic C$=$C region of the membrane materials allow estimation of the amount of aromatic groups retained in the silica matrix. The calculation is made using the intensity of the aromatic C$=$C bands in triphenylphosphine oxide as a basis, with the C$\equiv$N bands in tetracyanoethylene serving as a common standard in the materials. The ratio of Si/phenyl in the PTES membrane is 3.6 while in the DPDES it is 2.3. Thus, a substantial amount of aromatic carbon is present in the membrane materials.

Example 10

This example describes the preparation of a hybrid membrane with a multiple top-layer (MTL) structure deposited on the one-layer gamma-alumina substrate. The membrane is composed of two top-layers prepared by a first deposition of phenyltriethoxysilane (PTES) and a subsequent second deposition of tetraethylorthosihcate (TEOS) both at high temperature in an atmosphere where the precursor concentration ranges from 1 to 100 volume % of the gas mixture.

The substrate employed in this example was a one-layer gamma-alumina substrate calcined at 923 K, as described in Example 2. The deposition for the first top layer was carried out at 873 K on the alumina substrate using CVD condition II with a medium PTES concentration of 0.19 mol m$^{-3}$ as listed in Table 1. The CVD process was conducted for 8 hours in a similar manner as described in Example 7. After the permeances for H$_2$, CH$_4$ and CO$_2$ were measured at 873 K, the resulting membrane was used as a new substrate for the deposition of the second top-layer. This second deposition was carried out at 873 K using CVD condition V with a TEOS concentration of 0.019 mol m$^{-3}$ listed in Table 2. The CVD apparatus shown in FIG. 3 was used. The CVD process was conducted at 873 K in a similar manner as described in U.S. Pat. No. 6,527,833. The assembly was first purged with the balance and dilute gas flows (17.2 and 13.5 μmol s$^{-1}$) for 30 minutes, then a TEOS carrier gas flow of 3.7 μmol s$^{-1}$ was passed through a bubbler filled with TEOS at 296 K and was premixed with the dilute argon gas flow before introduction to the inside of the support. The resulting TEOS concentration was 0.0193 mol m.$^{-3}$. The deposition times were 2, 2.8, 3.8 and 4.1 hours, respectively. After the CVD process was finished, the assembly was purged with the balance and dilute gas flows for 30 minutes. The membrane was designated MTL-873-II-V. Gas permeation measurements were conducted at 873 K on $H_2$, $CH_4$ and $CO_2$.

The permeation properties at 873 K before and after CVD of TEOS are listed in Table 15. After 3.8 hours of CVD, the $H_2$ permeance through the multiple top-layer (MTL) composite membrane remained high at $1.0 \times 10^{-6}$ mol m$^{-2}$ s$^{-1}$ Pa$^{-1}$ at 873 K while the $H_2$ selectivities over $CH_4$ and $CO_2$ were good, 32 and 17, respectively. The CVD process was continued for another 20 minutes, the H2 selectivity over $CH_4$ increased to 56 but the $H_2$ permeance was reduced to $8.7 \times 10^{-7}$ mol m$^{-2}$ s$^{-1}$ Pa$^{-1}$.

TABLE 16

Gas permeation properties of a multiple top-layer (MTL) composite membrane MTL-873-II-V before and after CVD of TEOS at 873 K

| Permeation properties | | 16 hr-PIES | 2.2 hr-SiO$_2$ | 4.2 hr-SiO$_2$ | 5.5 h-SiO$_2$ | 7.5 h-SiO$_2$ |
|---|---|---|---|---|---|---|
| Permeance (mol m$^{-2}$ s$^{-1}$ Pa$^{-1}$) | H$_2$ | $1.8 \times 10^{-5}$ | $7.3 \times 10^{-6}$ | $2.4 \times 10^{-6}$ | $3.0 \times 10^{-6}$ | $3.5 \times 10^{-6}$ |
| | CH$_4$ | $6.8 \times 10^{-6}$ | $2.7 \times 10^{-6}$ | $3.3 \times 10^{-7}$ | $3.2 \times 10^{-7}$ | $1.3 \times 10^{-7}$ |
| | CO$_2$ | $4.3 \times 10^{-6}$ | $1.7 \times 10^{-6}$ | $5.5 \times 10^{-7}$ | $4.5 \times 10^{-7}$ | $3.7 \times 10^{-7}$ |
| Selectivity | H$_2$/CH$_4$ | 2. | 2.7 | 7.4 | 9.3 | 27 |
| | H$_2$/CO$_2$ | 4. | 4.2 | 4.4 | 6.6 | 9.4 |

TABLE 15

Gas permeation properties of a multiple top-layer composite membrane MTL-873-II-V before and after CVD of TEOS at 873 K

| Permeation properties | | 8 hr-hybrid | 2 hr-iO$_2$ | 2.8 SiO$_2$ | 3.8 h-SiO$_2$ | 4.1 h-SiO$_2$ |
|---|---|---|---|---|---|---|
| Permeance (mol m$^{-2}$ s$^{-1}$ Pa$^{-1}$) | H2 | $3.4 \times 10^{-5}$ | $2.2 \times 10^{-6}$ | $1.2 \times 10^{-6}$ | $1.0 \times 10^{b}$ | $8.7 \times 10^{-7}$ |
| | CH$_4$ | $1.3 \times 10^{-5}$ | $5.2 \times 10^{-7}$ | $1.8 \times 10^{-7}$ | $3.1 \times 10^{-8}$ | $1.6 \times 10^{-8}$ |
| | CO$_2$ | $8.2 \times 10^{-6}$ | $4.1 \times 10^{-7}$ | $2.1 \times 10^{-7}$ | $6.0 \times 10^{-8}$ | $3.4 \times 10^{-8}$ |
| Selectivity | H$_2$/CH$_4$ | 2.6 | 4.1 | 7.0 | 32 | 56 |
| | H$_2$/CO$_2$ | 4.2 | 5.3 | 6.1 | 17 | 26 |

Example 11

This example describes the preparation of another multiple top-layer (MTL) hybrid membrane. The top layers were deposited by a first CVD of phenyltriethoxysilane (PTES) and subsequently by a second CVD of tetraethylorthosilicate (TEOS) both at high temperature in an atmosphere where the precursor concentration ranges from 1 to 100 volume % of the gas mixture.

Differing from Example 10, the substrate employed in this example had a graded three-layer gamma-alumina intermediate layer with the third layer calcined at 923 K for 2 h, as described in Example 2. The preparation involved two steps as in Example 10. First an initial deposition of PTES was conducted at 873 K for 16 hours using CVD condition II listed in Table 1 and then a second deposition of TEOS was carried out at 873 K for 2.2, 4.2, 5.5 and 7.5 hours, respectively using CVD condition V. The membrane was denoted MTL-873-II-V. The permeation properties at 873 K before and after CVD of TEOS are listed in Table 16. After 7.5 hours of CVD, the resulting composite membrane exhibited extremely high $H_2$ permeance, $3.5 \times 10^{-6}$ mol m$^{-2}$ s$^{-1}$ Pa$^{-1}$ at 873 K while the $H_2$ selectivity over $CH_4$ was 27.

Example 12

This example describes the preparation of a mixed top-layer (XTL) hybrid membrane deposited on a one-layer gamma-alumina membrane substrate calcined at 923 K for 2 hours as described in Example 2. The mixed top-layer of silica was prepared by a dual-precursor chemical vapor deposition (CVD) technique using a mixed Si source of tetraethylorthoslicate (TEOS) and phenyltriethoxysilane (PTES). A mixed source containing 37 molar percent of PTES was chosen in this example. The CVD apparatus is shown in FIG. 3.

The CVD was conducted at 873 K using CVD condition VII listed in Table 3. The resulting membrane was designated as XTL-873-VII. The support covered with one-layer of gamma-alumina was installed and heated to 873 K. An argon gas flow of 20.0 μmmol s$^{-1}$ was introduced on the outer shell side and a dilute argon gas flow of 12.3 μmmol s$^{-1}$ was passed on the inner tube side. After 30 minutes a TEOS carrier argon gas flow of 4.3 μmmol s$^{-1}$ was passed through a bubbler filled with TEOS at 296 K and a separate PTES carrier argon gas flow of 3.4 μmmol s$^{-1}$ was passed through a bubbler filled with PTES at 348 K. The two carrier gases were then premixed with the dilute argon flow before introduction to the inside of the support. The concentrations of PTES and TEOS were 0.0119 and 0.0193 mol m$^{-3}$, respectively, leading to 37 mol % of PTES in the mixed Si source. The deposition was conducted for 3 hours. The gas permeation properties before and after CVD were measured and listed in Table 17. Before CVD, the permeance for $H_2$, $CH_4$ and $CO_2$ were quite high, of the order of 10$^{-5}$ mol m$^{-2}$ s$^{-1}$ Pa$^{-1}$, but the $H_2$ selectivities over $CH_4$ and $CO_2$ were very low, 2.8 and 4.4, respectively, since the permeation flow through the alumina substrate was dominated by Knudsen diffusion. After 3 h of deposition of hybrid layer, the resulting composite membrane exhibited excellent $H_2$ separation properties with $H_2$ selectivities of over 3000 and a $H_2$ permeance of $1.6 \times 10^{-7}$ mol m$^{-2}$ s$^{-1}$ Pa$^{-1}$ at 873 K. These values are similar to those for TEOS-derived silica membranes formed on one-layer alumina substrates, as described in U.S. Pat. No. 6,527,833.

TABLE 17

Gas permeation properties of a the mixed top-layer hybrid membrane XTL-873-VII before and after dual-element CVD at 873 K

| Permeation properties | | One-layer alumina substrate | XTL-873-VII |
|---|---|---|---|
| Permeance | $H_2$ | $4.3 \times 10^{-5}$ | $1.6 \times 10^{-7}$ |
| (mol m$^{-2}$ s$^{-1}$ Pa$^{-1}$) | $CH_4$ | $1.4 \times 10^{-5}$ | $3.7 \times 10^{-11}$ |
| | $CO_2$ | $9.1 \times 10^{-6}$ | $5.0 \times 10^{-11}$ |
| Selectivity | $H_2/CH_4$ | 2.8 | 4400 |
| | $H_2/CO_2$ | 4.4 | 3300 |

Example 13

This example describes the preparation of three other mixed top-layer hybrid membranes using different molar ratio of PTES to TEOS. The hybrid membranes were deposited at 873 K on the same one-layer alumina substrate calcined at 923 K for 2 h described in Example 2, but using different CVD process parameters denoted as Condition VI, Condition VIII and Condition IX, and listed in Table 3. The PTES contents in the Si source TEOS were 17%, 50% and 60% for Conditions VI, VIII and IX, respectively. The resulting hybrid membranes were designed as XTL-873-VI, XTL-873-VIII, and XTL-873-IX, correspondingly. The CVD process was conducted at 873 K for 3 hours in the same manner as in Example 12. The permeation properties were measured and are listed in Table 18. It was found that the hybrid membrane prepared with increasing PTES content showed increasingly high $H_2$ permeance but decreasing $H_2$ selectivity. This trend is also clearly demonstrated in FIG. 14. When the molar ratio of PTES to TEOS was 1.4, the resulting membrane XTL-873-IX had a high $H_2$ permeance of $4.4 \times 10^{-7}$ mol m$^{-2}$ s$^{-1}$ Pa$^{-1}$ but the selectivities of $H_2$ over $CH_4$ and $CO_2$ were 7.5 and 13. As described previously, compared with the TEOS-derived silica membrane, the PTES-derived hybrid membrane has a looser structure and bigger pore size, thus leading to high $H_2$ permeance but low $H_2$ selectivity. The higher PTES content employed, the higher the permeance but the lower selectivity of the resulting membrane obtained.

The membrane with a loose structure and bigger pore size has low activation energy for gas permeance. FIG. 15 compares Arrhenius plots for the permeance of $H_2$ through the PTES-derived membrane, PTES-TEOS-derived membranes and TEOS-derived membrane. It is clear that the membrane obtained using more PTES content has higher permeance and lower activation energy for $H_2$. The TEOS-derived membrane had lowest permeance of $1.2 \times 10^{-7}$ mol m$^{-2}$ s$^{-1}$ Pa$^{-1}$ at 873 K and highest activation energy of 15 kJ mol$^{-1}$ for $H_2$ (D. Lee, et al. J. Memebr. Sci., 231 (2004) 117), while the PTES-derived membrane exhibited the highest permeance of $2.2 \times 10^{-6}$ mol m$^{-2}$ s$^{-1}$ Pa$^{-1}$ at 823 K and lowest activation energy of 3.9 kJ mol$^{-1}$ for $H_2$.

TABLE 18

Gas Permeation properties of mixed top-layer (XTL) hybrid membranes before and after dual-precursor CVD at 873 K

| Permeation properties | | One-layer alumina substrate | XTL-873-VI (17% PTES) | XTL-873-VIII (50% PTES) | XTL-873-IX (60% PTES) |
|---|---|---|---|---|---|
| Permeance | $H_2$ | $4.0 \times 10^{-5}$ | $2.1 \times 10^{-7}$ | $2.7 \times 10^{-7}$ | $4.4 \times 10^{-7}$ |
| (mol m$^{-2}$ s$^{-1}$ | $CH_4$ | $1.4 \times 10^{-5}$ | $2.3 \times 10^{-9}$ | $1.2 \times 10^{-8}$ | $5.8 \times 10^{-8}$ |
| Pa$^{-1}$) | $CO_2$ | $9.1 \times 10^{-6}$ | $1.6 \times 10^{-9}$ | $7.3 \times 10^{-9}$ | $3.3 \times 10^{-8}$ |
| Selectivity | $H_2/CH_4$ | 2.8 | 89 | 23 | 7.5 |
| | $H_2/CO_2$ | 4.4 | 130 | 38 | 13 |

Example 14

This example describes the hydrothermal stability of mixed top-layer hybrid membranes prepared by the dual-precursor CVD of PTES and TEOS. The hybrid membranes used in this example were fresh samples of XTL-873-VII and XTL-873-IX deposited on one-layer gamma-alumina substrate using the mixed Si sources containing 37 mol % and 60 mol % PTES as described in Examples 12 and 13. The hydrothermal stability test was carried out as previously described on these hybrid membranes at 873 K for 130-200 h under harsh conditions with 78 mol % water vapor. To compare with the hybrid membranes, one TEOS-derived silica membrane was prepared at 873 K on a three-layer alumina substrate by CVD of TEOS as described in U.S. patent (S. T. Oyama, Y. Gu, D. Lee, U.S. Pat. No. 7,179,325B2, Feb. 20, 2007). The test on the silica membrane was conducted at the same temperature (873 K) but under a gentle environment containing only 16 mol % water vapor in argon. Table 19 and FIG. 16 show changes in the $H_2$ permeance through these two PTES-TEOS derived membranes and one silica membrane with exposure time. The majority of the reduction of the permeance was found for all membranes in the first 10 h. After 40 h of exposure to water vapor, the permeance became stable or decreased very slowly. However, the degree of reduction was different between the hybrid membranes and silica membrane. Although the hybrid membranes were exposed to much harsh conditions (78 mol % steam vs. 16 mol % steam), the H2 permeance through these two hybrid membranes was reduced by 50-70% after 200 h-exposure in comparison to 90% for the TEOS-derived silica membranes. Among the hybrid membranes, the membrane prepared with higher PTES content exhibited less reduction in $H_2$ permeance (50% vs. 70% for a 130 h-exposure). In summary, PTES-TEOS derived hybrid membranes show better hydrothermal stability than the TEOS-derived silica membrane. Higher PTES content results in better hydrothermal stability.

The hydrophilicity of the TEOS-derived silica membrane is due to the presence of a large number of Si—OH groups on the surface of silica clusters. The attachment of hydrolytically stable Si-aromatic group to the silica clusters results in hydrophobic membranes that better withstand moisture. The more PTES used, the more aromatic groups remaining in the membrane and thus the stronger the resistance to densification.

TABLE 19

Changes of $H_2$ permeance with the exposure time for two hybrid membranes and one silica membrane. The hybrid membranes were exposed at 873 K to 78 mol % water vapor, while the silica membrane was exposed at 873 K to 16 mol % water vapor.

| | Permeance | | |
| --- | --- | --- | --- |
| | Hybrid membranes | | |
| (mol m$^{-2}$ s$^{-1}$ Pa$^{-1}$) | XTL-873-IX (60% PTES) | XTL-873-VII (37% PTES) | SiO$_2$ membrane |
| Original | 3.37 × 10$^{-7}$ | 1.64 × 10$^{-7}$ | 4.96 × 10$^{-7}$ |
| 2 h- Exposure | 2.35 × 10$^{-7}$ | 1.42 × 10$^{-7}$ | 1.42 × 10$^{-7}$ |
| (change) | (−30.3%) | (−27.4%) | (−71.4%) |
| 10 h- Exposure | 1.97 × 10$^{-7}$ | 8.03 × 10$^{-8}$ | 9.87 × 10$^{-8}$ |
| (change) | (−45.1%) | (−51.0%) | (−80.1%) |
| 40 h- Exposure | 1.72 × 10$^{-7}$ | 5.46 × 10$^{-8}$ | 7.69 × 10$^{-8}$ |
| (change) | (−49.0%) | (−66.7%) | (−84.5%) |
| 130 h- Exposure | 1.69 × 10$^{-7}$ | 4.99 × 10$^{-8}$ | 5.25 × 10$^{-8}$ |
| (change) | (−49.9%) | (−69.6%) | (−89.5%) |
| 200 h- Exposure | n/a | 5.79 × 10$^{-8}$ | 4.27 × 10$^{-8}$ |
| (change) | n/a | (−64.7%) | (−91.4%) |

Example 15

This example describes the use of the precursor diphenyldiethoxysilane (DPDES), a molecule analogous to phenyltriethoxysilane (PTES), except that another phenyl group substitutes for one of the ethyl groups. The purpose is to investigate the possibility of further size control of precursors to improve permeability.

DPDES-TEOS-DMDCS membranes were prepared by three component chemical vapor deposition of diphenyldiethoxysilane (DPDES, Aldrich, 98%), tetraethylorthosilicate (TEOS, Aldrich, 98%) and dimethyldichlorosilane (DMDCS, Aldrich, 98%) in argon flow at 823 K simultaneously. A TEOS-DMDCS solution was again prepared at a molar ratio of 3/1 by mixing them in the same bubbler which was kept at 298 K as described earlier. The molar ratio of DPDES/(TEOS-DMDCS) was adjusted by changing the temperature of the oil bath. The DPDES bubbler temperature was set at 393 K to 413 K to obtain a molar ratio range of 0.05 to 0.15.

The permeation rates of DPDES-TEOS-DMDCS membranes are presented for various gases at different temperatures in FIG. 17. The permeation of gases followed the order of size through all types of DPDES-TEOS-DMCS membranes, and they decreased slightly with decreasing temperature. Higher molar ratios of DPDES/(TEOS-DMDCS) resulted in higher $CO_2/CH_4$ selectivities, which were in the range 15-20. Having more phenyl groups in the membrane matrix resulted in a less dense structure. Thus, the permeation of gases through the DPDES-TEOS-DMDCS membranes was higher when compared to the PTES-TEOS-DMDCS with similar $CO_2/CH_4$ selectivities.

While the various embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention.

The discussion of a reference in the Background of the Invention is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A composition comprising a hybrid composite organic-inorganic membrane wherein said membrane comprises:
   an amorphous porous layer comprising silica incorporating organic functionalities selected from the group consisting of aromatic groups, olefinic groups, and alicyclic groups; and
   a porous substrate;
   wherein said amorphous porous layer is deposited on said porous substrate by chemical vapor deposition of gaseous precursors in an atmosphere where the precursor concentration ranges from 1 to 100 volume % of the gas mixture at a temperature from 673 K to 1173 K.

2. The hybrid composite organic-inorganic membrane of claim 1, wherein said organic functionalities comprise aromatic groups obtained from decomposition of phenyl-substituted silanes or siloxanes.

3. The hybrid composite organic-inorganic membrane of claim 1, wherein said organic functionalities comprise aromatic groups obtained from the decomposition of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any mixture thereof.

4. The hybrid composite organic-inorganic membrane of claim 2, wherein said phenyl-substituted silanes is selected from the group consisting of phenyltriethoxysilane (PTES), diphenyldiethoxysilane (DPDES), and any mixture thereof.

5. The hybrid composite organic-inorganic membrane of claim 1, wherein said silica is formed from at least one silica precursor selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any mixture thereof.

6. The hybrid composite organic-inorganic membrane of claim 1, wherein said silica is formed from at least one silica precursor selected from the group consisting of alkoxides of silicon, chlorosilanes, and any mixture thereof, wherein
   said alkoxides of silicon including tetramethylorthosilicates (tetramethoxysilanes), tetraethylorthosilicates (tetraethoxysilanes) and tetrapropylorthosilicates (tetrapropoxysilanes),
   said chlorosilanes including chloro-, dichloro-, trichloromethylsilanes, ethylsilanes, and propylsilanes.

7. The hybrid composite organic-inorganic membrane of claim 1, wherein said amorphous porous layer comprises a single top-layer (STL) made by the decomposition of a silica precursor, wherein said silica precursor selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any mixture thereof.

8. The hybrid composite organic-inorganic membrane of claim 1, wherein said amorphous, porous layer comprises a single top-layer (STL) made by the decomposition of phenyltriethoxysilane (PTES).

9. The hybrid composite organic-inorganic membrane of claim 1, wherein said amorphous porous layer comprises a single top-layer (STL) made by the decomposition of diphenyldiethoxysilane (DPDES).

10. The hybrid composite organic-inorganic membrane of claim 1, wherein said amorphous porous layer comprises multiple top-layers (MTL) prepared by successive use of a phenyl group precursor, a silica precursor, and any mixture thereof, wherein
said phenyl group selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any combination thereof,
said silica precursor selected from the group consisting of alkoxides of silicon, chlorosilanes, and the mixture thereof, wherein said alkoxides of silicon including tetramethylorthosilicates (tetramethoxysilanes), tetraethylorthosilicates (tetraethoxysilanes) and tetrapropylorthosilicates (tetrapropoxysilanes); said chlorosilanes including chloro-, dichloro-, trichloro-methylsilanes, ethylsilanes, and propylsilanes.

11. The hybrid composite organic-inorganic membrane of claim 1, wherein said amorphous porous layer comprises multiple top-layers (MTL) made from the sequential decomposition of phenyltriethoxysilane (PTES) and tetraethylorthosilicate (TEOS).

12. The hybrid composite organic-inorganic membrane of claim 1, wherein said amorphous, porous layer comprises multiple top-layers (MTL) made from the sequential decomposition of diphenyldiethoxysilane (DPDES) and tetraethylorthosilicate (TEOS).

13. The hybrid composite organic-inorganic membrane of claim 1, wherein said amorphous porous layer comprises mixed top-layers (XTL) obtained from the simultaneous use of two or more different silica precursors selected from a first group, a second group, and any mixture thereof, wherein
said first group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any combination thereof;
said second group consisting of alkoxides of silicon, chlorosilanes, and the mixture thereof, wherein said alkoxides of silicon including tetramethylorthosilicates (tetramethoxysilanes), tetraethylorthosilicates (tetraethoxysilanes) and tetrapropylorthosilicates (tetrapropoxysilanes); said chlorosilanes including chloro-, dichloro-, trichloro-methylsilanes, ethylsilanes, and propylsilanes.

14. The hybrid composite organic-inorganic membrane of claim 1, wherein said amorphous porous layer comprises mixed top-layers (XTL) made by the simultaneous decomposition of phenyltriethoxysilane (PTES) and tetraethylorthosilicate (TEOS).

15. The hybrid composite organic-inorganic membrane of claim 1, wherein said amorphous porous layer comprises mixed top-layers (XTL) made by the simultaneous decomposition of diphenyldiethoxysilane (DPDES) and tetraethylorthosilicate (TEOS).

16. The hybrid composite organic-inorganic membrane of claim 1, wherein said porous substrate comprises at least one layer selected from the group consisting of alumina, titania, silica, zirconia, boria, perovskites, spinels, pyrochlores, zeolites, stainless steel, and any combination thereof.

17. The hybrid composite organic-inorganic membrane of claim 1, wherein said porous substrate comprises a single layer of alumina.

18. The hybrid composite organic-inorganic membrane of claim 1, wherein said porous substrate comprises a single layer of alumina prepared by coating a mesoporous support with a single dilute sol dipping solution followed by a calcination step.

19. The hybrid composite organic-inorganic membrane of claim 1, wherein said porous substrate comprises multiple graded layers of alumina with a gradually decreasing pore size structure.

20. The hybrid composite organic-inorganic membrane of claim 1, wherein said porous substrate comprises multiple graded layers of alumina prepared by coating a macroporous support with a series of dilute sol dipping solutions containing boehmite sols of different particle followed by a calcination step.

21. The hybrid composite organic-inorganic membrane of claim 1, wherein the permeance of said membrane for $H_2$ at 873 K is greater than $1.0 \times 10^{-7}$ mol m$^{-2}$ s$^{-1}$ Pa$^{-1}$ and the selectivity for $H_2$ with respect to gases selected from the group consisting of $CH_4$ and $CO_2$ is greater than 9.

22. The hybrid composite organic-inorganic membrane of claim 1, wherein the permeance at 273 K to 403 K of said membrane for $CO_2$ at least $1.0 \times 10^{-8}$ mol m$^{-2}$ s$^{-1}$ Pa$^{-1}$ and the selectivity for $CO_2$ with respect to $CH_4$ is at least 12.

23. The hybrid composite organic-inorganic membrane of claim 1, wherein the selectivity for $H_2$ is from 27 to 56 with respect to $CH_4$ at 873 K, 9.4 to 26 with respect to $CO_2$ at 873 K, and wherein the permeance for $H_2$ is greater than $1.0 \times 10^{-7}$ mol m$^{-2}$ s$^{-1}$ Pa$^{-1}$ at 873 K.

24. The hybrid composite organic-inorganic membrane of claim 1, wherein the selectivity for $CO_2$ is from 380 to 12 with respect to $CH_4$ from 273 K to 403 K, respectively, and wherein the permeance for $CO_2$ is at least $3.4 \times 10^{-8}$ mol m$^{-2}$ s$^{-1}$ Pa$^{-1}$ from 273 K to 403 K, respectively.

25. The hybrid composite organic-inorganic membrane of claim 8, wherein the permeance of said membrane for $CO_2$ is at least $1.0 \times 10^{-8}$ mol m$^{-2}$ s$^{-1}$ Pa$^{-1}$ at 273 K to 403 K, and the selectivity for $CO_2/CH_4$ at least 26.

26. The hybrid composite organic-inorganic membrane of claim 11 wherein the permeance of said membrane for $H_2$ is at least $1.0 \times 10^{-6}$ mol m$^{-2}$ s$^{-1}$ Pa$^{-1}$ at 773 K to 823 K, and the selectivity for $H_2/CH_4$ is at least 6.

27. The hybrid composite organic-inorganic membrane of claim 14, wherein the permeance of said membrane for $H_2$ is greater than $1.0 \times 10^{-7}$ mol m$^{-2}$ s$^{-1}$ Pa$^{-1}$ at 873 K, and the selectivity for $H_2/CH_4$ and $H_2/CO_2$ are about 56 and 26, respectively.

28. The hybrid composite organic-inorganic membrane of claim 14, wherein the permeance of said membrane for $H_2$ reduces 30% to 70% after said membrane being exposed at 873 K to 78 mol % water vapor for 2 to 200 hours.

29. A method for preparing a hybrid composite organic-inorganic membrane, comprising:
providing an amorphous porous layer comprising silica incorporating organic functionalities selected from the group consisting of aromatic groups, olefinic groups, and alicyclic groups; and providing a porous substrate;
wherein said amorphous porous layer is deposited on said porous substrate by chemical vapor deposition of gaseous precursors in an atmosphere where the concentration of the gas ranges from 1% to 100% at temperature from 673 K to 1173 K.

30. The method for preparing a hybrid composite organic-inorganic membrane of claim 29, wherein said organic functionalities comprise aromatic groups obtained from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any mixture thereof.

31. The method for preparing a hybrid composite organic-inorganic membrane of claim 29, wherein said silica is formed from at least one silica precursor selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any mixture thereof.

32. The method for preparing a hybrid composite organic-inorganic membrane of claim 29, wherein said silica is formed from at least one silica precursor selected from the group consisting of alkoxides of silicon, chlorosilanes, and any mixture thereof, wherein said alkoxides of silicon including tetramethylorthosilicates (tetramethoxysilicates), tetraethylorthosilicates (tetraethoxysilicates) and tetrapropylorthosilicates (tetrapropoxysilicates); said chlorosilanes including chloro-, dichloro-, trichloro-methylsilanes, ethylsilanes, and propylsilanes.

33. The method for preparing a hybrid composite organic-inorganic membrane of claim 29, wherein said amorphous porous layer comprises a single top-layer (STL) made by the decomposition of a silica precursor, wherein said silica precursor selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any mixture thereof.

34. The method for preparing a hybrid composite organic-inorganic membrane of claim 29, wherein said amorphous porous layer comprises multiple top-layers (MTL) prepared by successive use of a phenyl group precursor, a silica precursor, and any mixture thereof,
wherein said phenyl group selected from the group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any combination thereof,
said silica precursor selected from the group consisting of alkoxides of silicon, chlorosilanes, and the mixture thereof, wherein said alkoxides of silicon including tetramethylorthosilicates (tetramethoxysilanes), tetraethylorthosilicates (tetraethoxysilanes) and tetrapropylorthosilicates (tetrapropoxysilanes); said chlorosilanes including chloro-, dichloro-, trichloro-methyl silanes, ethyl silanes, and propylsilanes.

35. The method for preparing a hybrid composite organic-inorganic membrane of claim 29, wherein said amorphous porous layer comprise mixed top-layers (XTL) obtained from the simultaneous use of two or more different silica precursors selected from a first group, a second group, and any mixture thereof, wherein
said first group consisting of phenyltriethoxysilane (PTES), diphenyldiethoxysilane (DPDES), triphenylethoxysilane (TPES), phenyltrimethoxysilane, diphenyldimethoxysilane, triphenylmethoxysilane, phenyltrimethylsilane, diphenyldimethylsilane, triphenylmethylsilane, and any combination thereof;
said second group consisting of alkoxides of silicon, chlorosilanes, and the mixture thereof, wherein said alkoxides of silicon including tetramethylorthosilicates (tetramethoxysilanes), tetraethylorthosilicates (tetraethoxysilanes) and tetrapropylorthosilicates (tetrapropoxysilanes); said chlorosilanes including chloro-, dichloro-, trichloro-methyl silanes, ethyl silanes, and propylsilanes.

36. The method for preparing a hybrid composite organic-inorganic membrane of claim 29, wherein said porous substrate comprises at least one layer selected from the group consisting of alumina, titania, silica, zirconia, boria, perovskites, spinels, pyrochlores, zeolites, stainless steel, and any combination thereof.

37. The method for preparing a hybrid composite organic-inorganic membrane of claim 29, wherein said porous substrate comprise a single layer of alumina.

38. The method for preparing a hybrid composite organic-inorganic membrane of claim 29, wherein said porous substrate comprise multiple graded layers of alumina with a gradually decreasing pore size structure.

39. The hybrid composite organic-inorganic membrane of claim 22, wherein the permeance at 273 K to 403 K of said membrane for $CO_2$ is at least $3.0 \times 10^{-8}$ mol m$^{-2}$ s$^{-1}$ Pa$^{-1}$ and the selectivity for $CO_2$ with respect to $CH_4$ is at least 59.

40. The hybrid composite organic-inorganic membrane of claim 24, wherein the permeance for $CO_2$ is at least $8.7 \times 10^{-8}$ mol m$^{-2}$ s$^{-1}$ Pa$^{-1}$ from 273 K to 403 K, respectively.

41. The hybrid composite organic-inorganic membrane of claim 25, wherein the permeance of said membrane for $CO_2$ is at least $3.0 \times 10^{-8}$ mol m$^{-2}$ s$^{-1}$ Pa$^{-1}$ at 273 K to 403 K, and the selectivity for $CO_2/CH_4$ at least 380.

42. The hybrid composite organic-inorganic membrane of claim 26 wherein the permeance of said membrane for $H_2$ is at least $2.0 \times 10^{-6}$ mol m$^{-2}$ s$^{-1}$ Pa$^{-1}$ at 773 K to 823 K, and the selectivity for $H_2/CH_4$ is at least 10.

* * * * *

UNITED STATES PATENT AND TRADEMARK OFFICE
CERTIFICATE OF CORRECTION

PATENT NO. : 7,938,894 B2
APPLICATION NO. : 12/039664
DATED : May 10, 2011
INVENTOR(S) : Shigeo Ted Oyama et al.

Page 1 of 1

It is certified that error appears in the above-identified patent and that said Letters Patent is hereby corrected as shown below:

Title page, Item (75) Inventors, the last inventor Scott A. Scholten should have residence in Ponca City, OK (US), and should read as follows --(75) Inventors: Shigeo Ted Oyama, Blacksburg, VA (US);
Yunfeng Gu, Painted Post, NY (US);
Joe D. Allison, Ponca City, OK (US);
Garry C. Gunter, Ponca City, OK (US);
Scott A. Scholten, Ponca City, OK (US)--.

Signed and Sealed this
Tenth Day of July, 2012

David J. Kappos
*Director of the United States Patent and Trademark Office*